United States Patent
Tomko et al.

(10) Patent No.: US 12,448,507 B1
(45) Date of Patent: Oct. 21, 2025

(54) COMPOSITE BOARD INCLUDING CORE AND CAPSTOCK, AND ASSOCIATED METHOD

(71) Applicant: THE AZEK GROUP LLC, Chicago, IL (US)

(72) Inventors: Nicholas Tomko, Chicago, IL (US); Evan Kemp, Chicago, IL (US)

(73) Assignee: The Azek Group LLC, Chicago, IL (US)

( * ) Notice: Subject to any disclaimer, the term of this patent is extended or adjusted under 35 U.S.C. 154(b) by 0 days.

(21) Appl. No.: 18/625,607

(22) Filed: Apr. 3, 2024

(51) Int. Cl.
| | |
|---|---|
| C08L 27/06 | (2006.01) |
| B32B 27/06 | (2006.01) |
| B32B 27/20 | (2006.01) |
| B32B 27/22 | (2006.01) |
| B32B 27/30 | (2006.01) |
| B32B 27/36 | (2006.01) |
| C08L 25/08 | (2006.01) |
| C08L 25/12 | (2006.01) |
| C08L 33/20 | (2006.01) |

(52) U.S. Cl.
CPC ........... C08L 27/06 (2013.01); B32B 27/06 (2013.01); B32B 27/20 (2013.01); B32B 27/22 (2013.01); B32B 27/302 (2013.01); B32B 27/304 (2013.01); B32B 27/308 (2013.01); B32B 27/36 (2013.01); C08L 25/12 (2013.01); C08L 33/20 (2013.01); B32B 2250/02 (2013.01); B32B 2270/00 (2013.01); B32B 2274/00 (2013.01); B32B 2325/00 (2013.01); B32B 2607/00 (2013.01); C08L 25/08 (2013.01); C08L 2205/02 (2013.01); C08L 2205/035 (2013.01); C08L 2207/04 (2013.01); Y10T 428/31935 (2015.04)

(58) Field of Classification Search
None
See application file for complete search history.

(56) References Cited

U.S. PATENT DOCUMENTS

| | | | | |
|---|---|---|---|---|
| 3,944,631 | A * | 3/1976 | Yu ........................ | C08F 285/00 525/308 |
| 4,111,876 | A * | 9/1978 | Bailey .................... | C08L 27/06 526/342 |
| 4,168,285 | A * | 9/1979 | Turczyk ................. | C08L 27/06 525/85 |
| 4,954,546 | A * | 9/1990 | Abeler ................... | C08L 27/06 524/180 |

(Continued)

Primary Examiner — Vivian Chen
(74) Attorney, Agent, or Firm — GREENBERG TRAURIG, LLP

(57) ABSTRACT

A composite board, including a core, and a capstock positioned to at least partially cover the core, where the capstock includes 10 wt. % to 70 wt. % of polyvinyl chloride (PVC), based on a total weight of the capstock, 1 wt. % to 60 wt. % of acrylonitrile-styrene-acrylate (ASA), based on the total weight of the capstock, 1 wt. % to 60 wt. % of styrene-acrylonitrile (SAN), based on the total weight of the capstock, and 1 wt. % to 60 wt. % of a thermoplastic elastomer, where the thermoplastic elastomer includes styrene-isobutylene-styrene (SIBS), a thermoplastic copolyester elastomer, a polymeric plasticizer, and combinations thereof, wherein the capstock does not include thermoplastic polyurethane.

3 Claims, 1 Drawing Sheet

(56) References Cited

U.S. PATENT DOCUMENTS

| | | | | |
|---|---|---|---|---|
| 5,334,450 | A | * | 8/1994 | Zabrocki ............... B32B 27/302 156/196 |
| 6,448,332 | B1 | * | 9/2002 | Hughes ................... C08L 51/06 525/70 |
| 6,689,840 | B1 | * | 2/2004 | Eustace ................... C08K 3/22 524/436 |
| 8,475,915 | B2 | | 7/2013 | Delprat et al. |
| 11,059,234 | B2 | | 7/2021 | Kahn et al. |
| 11,136,443 | B2 | | 10/2021 | Crabb et al. |
| 2007/0154689 | A1 | | 7/2007 | Hughes et al. |
| 2009/0258208 | A1 | | 10/2009 | Martin et al. |
| 2011/0129628 | A1 | * | 6/2011 | Dave ........................ C08K 3/26 252/400.52 |
| 2011/0275747 | A1 | * | 11/2011 | Hacker ................ C08K 5/3462 524/211 |
| 2012/0128967 | A1 | * | 5/2012 | Belcher, Jr. ............. B29C 48/92 428/319.3 |
| 2017/0081510 | A1 | * | 3/2017 | Van Rheenen ......... C08L 27/06 |
| 2019/0145109 | A1 | * | 5/2019 | Esbelin .................... B32B 5/24 428/213 |
| 2020/0290324 | A1 | | 9/2020 | Calvin et al. |
| 2020/0354560 | A1 | | 11/2020 | Wang et al. |
| 2021/0108064 | A1 | | 4/2021 | Frenkel et al. |
| 2023/0139071 | A1 | * | 5/2023 | Griffin ................... B32B 27/08 442/38 |
| 2024/0002651 | A1 | * | 1/2024 | Macy ................... C08F 220/40 |

* cited by examiner

COMPOSITE BOARD INCLUDING CORE AND CAPSTOCK, AND ASSOCIATED METHOD

FIELD

The present invention relates to a building material, and, more specifically, to a composite board.

BACKGROUND

Conventional composite boards includes a core, and a capstock covering the core.

SUMMARY

The Claims, rather than the Summary, define covered embodiments of the present invention. The Summary is a high-level overview of various aspects of the invention, and introduces some concepts that are further described in the Detailed Description below. The Summary is not intended to identify key or essential features of the claimed subject matter, and also is not intended to be used in isolation to determine the scope of the claimed subject matter. Instead, the claimed subject matter should be understood by reference to appropriate portions of the Specification and drawings, as well as to each claim.

In some embodiments, the present invention provides a composite board, comprising: a core; and a capstock positioned to at least partially cover the core, wherein the capstock comprises: 10 wt. % to 70 wt. % of polyvinyl chloride (PVC), based on a total weight of the capstock, 1 wt. % to 60 wt. % of acrylonitrile-styrene-acrylate (ASA), based on the total weight of the capstock, 1 wt. % to 60 wt. % of styrene-acrylonitrile (SAN), based on the total weight of the capstock, and 1 wt. % to 60 wt. % of a thermoplastic elastomer, wherein the thermoplastic elastomer does not include thermoplastic polyurethane.

In some embodiments, the thermoplastic elastomer comprises at least one of styrene-isobutylene-styrene (SIBS), a thermoplastic copolyester elastomer, or combinations thereof.

In some embodiments, the thermoplastic copolyester elastomer comprises a thermoplastic ether ester elastomer.

In some embodiments, the capstock comprises 5 wt. % to 30 wt. % of the thermoplastic elastomer.

In some embodiments, the capstock further comprises: 30 wt. % to 50 wt. % of PVC, 20 wt. % to 40 wt. % of ASA, and 10 wt. % to 30 wt. % of SAN.

In some embodiments, the capstock further comprises at least one of colorant, pigment, plasticizer, lubricant, ultraviolet (UV) stabilizer, light stabilizer, thermal stabilizer, antioxidant (AO), antistatic agent, flame retardant, filler, fiber, processing aid, biocide, surfactant, blowing agent, foaming agent, wax, and/or combinations thereof.

In some embodiments, the capstock further comprises at least one of colorant, pigment, plasticizer, lubricant, ultraviolet (UV) stabilizer, light stabilizer, thermal stabilizer, antioxidant (AO), antistatic agent, flame retardant, filler, fiber, processing aid, biocide, surfactant, blowing agent, foaming agent, wax, and/or combinations thereof.

In some embodiments, the present invention provides a composite board, comprising: a core; and a capstock positioned to at least partially cover the core, wherein the capstock comprises: 10 wt. % to 70 wt. % of polyvinyl chloride (PVC), based on a total weight of the capstock, 1 wt. % to 60 wt. % of acrylonitrile-styrene-acrylate (ASA), based on the total weight of the capstock, 1 wt. % to 60 wt. % of styrene-acrylonitrile (SAN), based on the total weight of the capstock, and 1 wt. % to 60 wt. % of a polymeric plasticizer, wherein the capstock does not include thermoplastic polyurethane.

In some embodiments, the polymeric plasticizer comprises a terpolymer.

In some embodiments, the terpolymer comprises a ketone ethylene ester terpolymer.

In some embodiments, the capstock comprises 5 wt. % to 30 wt. % of the polymeric plasticizer.

In some embodiments, the capstock further comprises: 30 wt. % to 50 wt. % of PVC, 20 wt. % to 40 wt. % of ASA, and 10 wt. % to 30 wt. % of SAN.

In some embodiments, the capstock further comprises at least one of colorant, pigment, plasticizer, lubricant, ultraviolet (UV) stabilizer, light stabilizer, thermal stabilizer, antioxidant (AO), antistatic agent, flame retardant, filler, fiber, processing aid, biocide, surfactant, blowing agent, foaming agent, wax, and/or combinations thereof.

In some embodiments, the capstock further comprises at least one of colorant, pigment, plasticizer, lubricant, ultraviolet (UV) stabilizer, light stabilizer, thermal stabilizer, antioxidant (AO), antistatic agent, flame retardant, filler, fiber, processing aid, biocide, surfactant, blowing agent, foaming agent, wax, and/or combinations thereof.

In some embodiments, the present invention provides a method comprising: coextruding a capstock with a core, thereby to form a composite board, wherein the capstock comprises: 10 wt. % to 70 wt. % of polyvinyl chloride (PVC), based on a total weight of the capstock, 1 wt. % to 60 wt. % of acrylonitrile-styrene-acrylate (ASA), based on the total weight of the capstock, 1 wt. % to 60 wt. % of styrene-acrylonitrile (SAN), based on the total weight of the capstock, and 1 wt. % to 60 wt. % of at least one of styrene-isobutylene-styrene (SIBS), a thermoplastic copolyester elastomer, a polymeric plasticizer, or combinations thereof, wherein the capstock does not include thermoplastic polyurethane.

In some embodiments, the polymeric plasticizer comprises a ketone ethylene ester terpolymer.

In some embodiments, the thermoplastic copolyester elastomer comprises a thermoplastic ether ester elastomer.

In some embodiments, the capstock further comprises: 30 wt. % to 50 wt. % of PVC, 20 wt. % to 40 wt. % of ASA, and 10 wt. % to 30 wt. % of SAN.

In some embodiments, the capstock further comprises at least one of colorant, pigment, plasticizer, lubricant, ultraviolet (UV) stabilizer, light stabilizer, thermal stabilizer, antioxidant (AO), antistatic agent, flame retardant, filler, fiber, processing aid, biocide, surfactant, blowing agent, foaming agent, wax, and/or combinations thereof.

In some embodiments, the capstock further comprises at least one of colorant, pigment, plasticizer, lubricant, ultraviolet (UV) stabilizer, light stabilizer, thermal stabilizer, antioxidant (AO), antistatic agent, flame retardant, filler, fiber, processing aid, biocide, surfactant, blowing agent, foaming agent, wax, and/or combinations thereof.

BRIEF DESCRIPTION OF THE FIGURES

This section refers to the drawings that form a part of this disclosure, and which illustrate some of the embodiments of structure, materials, and/or methods of the present invention described herein.

DETAILED DESCRIPTION

Figure 2:
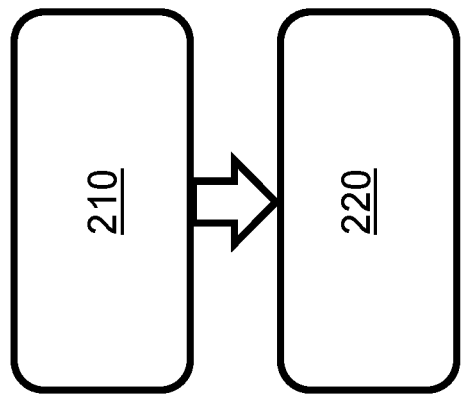
FIG. 2 is a block diagram of a method of forming the building material, in accordance with some embodiments of the invention.

In addition to the benefits and improvements that the Specification discloses, other objects and advantages that the Specification provides will become apparent from the following description taken in conjunction with the accompanying figures. Although the description discloses and describes detailed embodiments of the present disclosure, the disclosed embodiments are merely illustrative of the disclosure that may be embodied in various forms. In addition, each of the examples given regarding the various embodiments of the disclosure are intended to be illustrative, and not restrictive.

Throughout the Specification, including the Detailed Description and Claims, the following terms take the meanings explicitly associated herein, unless the context dictates otherwise. The phrases "in an embodiment," "in some embodiments," and any similar phrase, as used herein, do not necessarily refer to the same embodiment or embodiments, though the phrases may refer to the same embodiment or embodiments. Furthermore, the phrases "in another embodiment," and any similar phrase, as used herein, do not necessarily refer to a different embodiment, although the phrases may refer to a different embodiment. All embodiments of the disclosure are intended to be combinable without departing from the scope or spirit of the disclosure.

As used herein, terms such as "comprising," "including," "having," "with," and any similar phrase or phrases, do not limit the scope of a specific claim to the materials or steps recited by the claim.

In some embodiments, the present invention including a building material. In some embodiments, the building material includes a decking material. In some embodiments, the building material includes a board. In some embodiments, the building material includes a composite decking material. In some embodiments, the building material includes a composite board. In some embodiments, the building material includes a core and a capstock. In some embodiments, the capstock at least partially covers at least one surface of the core. In some embodiments, the capstock covers at least one surface of the core. In some embodiments, the capstock covers multiple surfaces of the core.

In some embodiments, the capstock includes a halogen-containing polymer. In some embodiments, the halogen-containing polymer. Includes polyvinyl chloride (PVC).

In some embodiments, the capstock includes an acrylic polymer. In some embodiments, the acrylic polymer includes acrylonitrile-styrene-acrylate (ASA).

In some embodiments, the capstock includes styrene-acrylonitrile (SAN).

In some embodiments, the capstock includes two or more of a halogen-containing polymer, an acrylic polymer, and/or SAN. In some embodiments, the capstock includes a halogen-containing polymer, an acrylic polymer, and SAN.

In some embodiments, the capstock includes two or more of PVC, ASA, and/or SAN. In some embodiments, the capstock includes PVC, ASA, and SAN.

In some embodiments, the capstock includes a thermoplastic elastomer, and one or more of PVC, ASA, and/or SAN. In some embodiments, the capstock includes a thermoplastic elastomer, and one or more of PVC, ASA, and/or SAN. In some embodiments, the thermoplastic elastomer includes a thermoplastic copolymer elastomer. In some embodiments, the thermoplastic elastomer does not include thermoplastic polyurethane (TPU). In some embodiments, the thermoplastic elastomer does not include an aliphatic polyether-based TPU. In some embodiments, the thermoplastic elastomer includes TPU and another thermoplastic elastomer.

In some embodiments, the thermoplastic elastomer includes styrene-isobutylene-styrene (SIBS). In some embodiments, the thermoplastic elastomer includes SIBS and styrene-isobutylene (SIB). In some embodiments, the thermoplastic elastomer includes a tri-block type SIBS. In some embodiments, the thermoplastic elastomer includes a di-block type SIB. In some embodiments, the thermoplastic elastomer includes a tri-block type SIBS and a di-block type SIB.

In some embodiments, the thermoplastic elastomer includes a thermoplastic copolyester elastomer. In some embodiments, the thermoplastic elastomer includes a thermoplastic ether ester elastomer.

In some embodiments, the thermoplastic elastomer includes a terpolymer. In some embodiments, the thermoplastic elastomer includes a ketone ethylene ester terpolymer.

In some embodiments, the capstock does not include TPU, and includes one or more of the above-identified thermoplastic elastomers. In some embodiments, the capstock includes one or more of the above-identified thermoplastic elastomers in addition to TPU.

In some embodiments, the capstock consists essentially of PVC, ASA, SAN, and a thermoplastic elastomer other than TPU. In some embodiments, the capstock consists essentially of PVC, ASA, SAN, and a thermoplastic elastomer other than TPU, and one or more of a colorant, pigment, plasticizer, lubricant, ultraviolet (UV) stabilizer, light stabilizer, thermal stabilizer, antioxidant (AO), antistatic agent, flame retardant, filler, fiber, processing aid, biocide, surfactant, blowing agent, foaming agent, wax, and/or combinations thereof.

Halogen-Containing Polymers

As stated, in some embodiments, the capstock includes a halogen-containing polymer. In some embodiments, the halogen-containing polymer. Includes one or more of PVC, polyvinyl fluoride, polyvinyl bromide, polyvinylidene chloride, chlorinated polyvinyl chloride, polyvinylidene fluoride, and polyvinylidene bromide, and combinations thereof.

In some embodiments, the capstock incudes 10 wt. % to 70 wt. % of the halogen-containing polymer. In, based on a total weight of the capstock. In some embodiments, the capstock includes 15 wt. % to 70 wt. % of the halogen-containing polymer. In some embodiments, the capstock includes 20 wt. % to 70 wt. % of the halogen-containing polymer. In some embodiments, the capstock includes 25 wt. % to 70 wt. % of the halogen-containing polymer. In some embodiments, the capstock includes 30 wt. % to 70 wt. % of the halogen-containing polymer. In some embodiments, the capstock includes 35 wt. % to 70 wt. % of the halogen-containing polymer. In some embodiments, the capstock includes 40 wt. % to 70 wt. % of the halogen-containing polymer. In some embodiments, the capstock includes 45 wt. % to 70 wt. % of the halogen-containing polymer. In some embodiments, the capstock includes 50 wt. % to 70 wt. % of the halogen-containing polymer. In some embodiments, the capstock includes 55 wt. % to 70 wt. % of the halogen-containing polymer. In some embodiments, the capstock includes 60 wt. % to 70 wt. % of the halogen-containing polymer. In some embodiments, the capstock includes 65 wt. % to 70 wt. % of the halogen-containing polymer In some embodiments, the capstock includes 10 wt. % to 65 wt. % of the halogen-containing polymer. In some embodiments, the capstock includes 15 wt. % to 65 wt. % of the halogen-containing polymer. In some embodiments, the capstock includes 20 wt. % to 65 wt. % of the halogen-containing polymer. In some embodiments, the capstock includes 25 wt. % to 65 wt. % of the halogen-containing polymer. In some embodiments, the capstock includes 30 wt. % to 65 wt. % of the halogen-containing polymer. In some embodiments, the capstock includes 35 wt. % to 65 wt. % of the halogen-containing polymer. In some embodiments, the capstock includes 40 wt. % to 65 wt. % of the halogen-containing polymer. In some embodiments, the capstock includes 45 wt. % to 65 wt. % of the halogen-containing polymer. In some embodiments, the capstock includes 50 wt. % to 65 wt. % of the halogen-containing polymer. In some embodiments, the capstock includes 55 wt. % to 65 wt. % of the halogen-containing polymer. In some embodiments, the capstock includes 60 wt. % to 65 wt. % of the halogen-containing polymer In some embodiments, the capstock includes 10 wt. % to 60 wt. % of the halogen-containing polymer. In some embodiments, the capstock includes 15 wt. % to 60 wt. % of the halogen-containing polymer. In some embodiments, the capstock includes 20 wt. % to 60 wt. % of the halogen-containing polymer. In some embodiments, the capstock includes 25 wt. % to 60 wt. % of the halogen-containing polymer. In some embodiments, the capstock includes 30 wt. % to 60 wt. % of the halogen-containing polymer. In some embodiments, the capstock includes 35 wt. % to 60 wt. % of the halogen-containing polymer. In some embodiments, the capstock includes 40 wt. % to 60 wt. % of the halogen-containing polymer. In some embodiments, the capstock includes 45 wt. % to 60 wt. % of the halogen-containing polymer. In some embodiments, the capstock includes 50 wt. % to 60 wt. % of the halogen-containing polymer. In some embodiments, the capstock includes 55 wt. % to 60 wt. % of the halogen-containing polymer In some embodiments, the capstock includes 10 wt. % to 55 wt. % of the halogen-containing polymer. In some embodiments, the capstock includes 15 wt. % to 55 wt. % of the halogen-containing polymer. In some embodiments, the capstock includes 20 wt. % to 55 wt. % of the halogen-containing polymer. In some embodiments, the capstock includes 25 wt. % to 55 wt. % of the halogen-containing polymer. In some embodiments, the capstock includes 30 wt. % to 55 wt. % of the halogen-containing polymer. In some embodiments, the capstock includes 35 wt. % to 55 wt. % of the halogen-containing polymer. In some embodiments, the capstock includes 40 wt. % to 55 wt. % of the halogen-containing polymer. In some embodiments, the capstock includes 45 wt. % to 55 wt. % of the halogen-containing polymer. In some embodiments, the capstock includes 50 wt. % to 55 wt. % of the halogen-containing polymer In some embodiments, the capstock includes 10 wt. % to 50 wt. % of the halogen-containing polymer. In some embodiments, the capstock includes 15 wt. % to 50 wt. % of the halogen-containing polymer. In some embodiments, the capstock includes 20 wt. % to 50 wt. % of the halogen-containing polymer. In some embodiments, the capstock includes 25 wt. % to 50 wt. % of the halogen-containing polymer. In some embodiments, the capstock includes 30 wt. % to 50 wt. % of the halogen-containing polymer. In some embodiments, the capstock includes 35 wt. % to 50 wt. % of the halogen-containing polymer. In some embodiments, the capstock includes 40 wt. % to 50 wt. % of the halogen-containing polymer. In some embodiments, the capstock includes 45 wt. % to 50 wt. % of the halogen-containing polymer In some embodiments, the capstock includes 10 wt. % to 45 wt. % of the halogen-containing polymer. In some embodiments, the capstock includes 15 wt. % to 45 wt. % of the halogen-containing polymer. In some embodiments, the capstock includes 20 wt. % to 45 wt. % of the halogen-containing polymer. In some embodiments, the capstock includes 25 wt. % to 45 wt. % of the halogen-containing polymer. In some embodiments, the capstock includes 30 wt. % to 45 wt. % of the halogen-containing polymer. In some embodiments, the capstock includes 35 wt. % to 45 wt. % of the halogen-containing polymer. In some embodiments, the capstock includes 40 wt. % to 45 wt. % of the halogen-containing polymer In some embodiments, the capstock includes 10 wt. % to 40 wt. % of the halogen-containing polymer. In some embodiments, the capstock includes 15 wt. % to 40 wt. % of the halogen-containing polymer. In some embodiments, the capstock includes 20 wt. % to 40 wt. % of the halogen-containing polymer. In some embodiments, the capstock includes 25 wt. % to 40 wt. % of the halogen-containing polymer. In some embodiments, the capstock includes 30 wt. % to 40 wt. % of the halogen-containing polymer. In some embodiments, the capstock includes 35 wt. % to 40 wt. % of the halogen-containing polymer In some embodiments, the capstock includes 10 wt. % to 35 wt. % of the halogen-containing polymer. In some embodiments, the capstock includes 15 wt. % to 35 wt. % of the halogen-containing polymer. In some embodiments, the capstock includes 20 wt. % to 35 wt. % of the halogen-containing polymer. In some embodiments, the capstock includes 25 wt. % to 35 wt. % of the halogen-containing polymer. In some embodiments, the capstock includes 30 wt. % to 35 wt. % of the halogen-containing polymer In some embodiments, the capstock includes 10 wt. % to 30 wt. % of the halogen-containing polymer. In some embodiments, the capstock includes 15 wt. % to 30 wt. % of the halogen-containing polymer. In some embodiments, the capstock includes 20 wt. % to 30 wt. % of the halogen-containing polymer. In some embodiments, the capstock includes 25 wt. % to 30 wt. % of the halogen-containing polymer In some embodiments, the capstock includes 10 wt. % to 25 wt. % of the halogen-containing polymer. In some embodiments, the capstock includes 15 wt. % to 25 wt. % of the halogen-containing polymer. In some embodiments, the capstock includes 20 wt. % to 25 wt. % of the halogen-containing polymer In some embodiments, the capstock includes 10 wt. % to 20 wt. % of the halogen-containing polymer. In some embodiments, the capstock includes 15 wt. % to 20 wt. % of the halogen-containing polymer. In some embodiments, the capstock includes 10 wt. % to 15 wt. % of the halogen-containing polymer Acrylic Polymer As stated, in some embodiments, the capstock includes an acrylic polymer. In some embodiments, the acrylic polymer includes one or more of ASA, styrene-acrylonitrile, cross-linked acrylonitrile, high molecular weight styrene-acrylonitrile, and/or ultra-high-molecular weight styrene-acrylonitrile, and/or combinations thereof.

In some embodiments, ASA includes a styrene including one or more of a vinyl aromatic monomer, an alkyl styrene, such as alpha-methylstyrene, and/or a ring-alkylated styrenes, such as p-methylstyrene, and/or combinations thereof.

In some embodiments, the capstock includes 1 wt. % to 60 wt. % of the acrylic polymer. In some embodiments, the capstock includes 2 wt. % to 60 wt. % of the acrylic polymer. In some embodiments, the capstock includes 3 wt. % to 60 wt. % of the acrylic polymer. In some embodiments, the capstock includes 4 wt. % to 60 wt. % of the acrylic polymer. In some embodiments, the capstock includes 5 wt. % to 60 wt. % of the acrylic polymer. In some embodiments, the capstock includes 10 wt. % to 60 wt. % of the acrylic polymer. In some embodiments, the capstock includes 15 wt. % to 60 wt. % of the acrylic polymer. In some embodiments, the capstock includes 20 wt. % to 60 wt. % of the acrylic polymer. In some embodiments, the capstock includes 25 wt. % to 60 wt. % of the acrylic polymer. In some embodiments, the capstock includes 30 wt. % to 60 wt. % of the acrylic polymer. In some embodiments, the capstock includes 35 wt. % to 60 wt. % of the acrylic polymer. In some embodiments, the capstock includes 40 wt. % to 60 wt. % of the acrylic polymer. In some embodiments, the capstock includes 45 wt. % to 60 wt. % of the acrylic polymer. In some embodiments, the capstock includes 50 wt. % to 60 wt. % of the acrylic polymer. In some embodiments, the capstock includes 55 wt. % to 60 wt. % of the acrylic polymer.

In some embodiments, a weight percent is 1 wt. % to 55 wt. % of the acrylic polymer. In some embodiments, the capstock includes 2 wt. % to 55 wt. % of the acrylic polymer. In some embodiments, the capstock includes 3 wt. % to 55 wt. % of the acrylic polymer. In some embodiments, the capstock includes 4 wt. % to 55 wt. % of the acrylic polymer. In some embodiments, the capstock includes 5 wt. % to 55 wt. % of the acrylic polymer. In some embodiments, the capstock includes 10 wt. % to 55 wt. % of the acrylic polymer. In some embodiments, the capstock includes 15 wt. % to 55 wt. % of the acrylic polymer. In some embodiments, the capstock includes 20 wt. % to 55 wt. % of the acrylic polymer. In some embodiments, the capstock includes 25 wt. % to 55 wt. % of the acrylic polymer. In some embodiments, the capstock includes 30 wt. % to 55 wt. % of the acrylic polymer. In some embodiments, the capstock includes 35 wt. % to 55 wt. % of the acrylic polymer. In some embodiments, the capstock includes 40 wt. % to 55 wt. % of the acrylic polymer. In some embodiments, the capstock includes 45 wt. % to 55 wt. % of the acrylic polymer. In some embodiments, the capstock includes 50 wt. % to 55 wt. % of the acrylic polymer.

In some embodiments, a weight percent is 1 wt. % to 50 wt. % of the acrylic polymer. In some embodiments, the capstock includes 2 wt. % to 50 wt. % of the acrylic polymer. In some embodiments, the capstock includes 3 wt. % to 50 wt. % of the acrylic polymer. In some embodiments, the capstock includes 4 wt. % to 50 wt. % of the acrylic polymer. In some embodiments, the capstock includes 5 wt. % to 50 wt. % of the acrylic polymer. In some embodiments, the capstock includes 10 wt. % to 50 wt. % of the acrylic polymer. In some embodiments, the capstock includes 15 wt. % to 50 wt. % of the acrylic polymer. In some embodiments, the capstock includes 20 wt. % to 50 wt. % of the acrylic polymer. In some embodiments, the capstock includes 25 wt. % to 50 wt. % of the acrylic polymer. In some embodiments, the capstock includes 30 wt. % to 50 wt. % of the acrylic polymer. In some embodiments, the capstock includes 35 wt. % to 50 wt. % of the acrylic polymer. In some embodiments, the capstock includes 40 wt. % to 50 wt. % of the acrylic polymer. In some embodiments, the capstock includes 45 wt. % to 50 wt. % of the acrylic polymer.

In some embodiments, the capstock includes 1 wt. % to 45 wt. % of the acrylic polymer. In some embodiments, the capstock includes 2 wt. % to 45 wt. % of the acrylic polymer. In some embodiments, the capstock includes 3 wt. % to 45 wt. % of the acrylic polymer. In some embodiments, the capstock includes 4 wt. % to 45 wt. % of the acrylic polymer. In some embodiments, the capstock includes 5 wt. % to 45 wt. % of the acrylic polymer. In some embodiments, the capstock includes 10 wt. % to 45 wt. % of the acrylic polymer. In some embodiments, the capstock includes 15 wt. % to 45 wt. % of the acrylic polymer. In some embodiments, the capstock includes 20 wt. % to 45 wt. % of the acrylic polymer. In some embodiments, the capstock includes 25 wt. % to 45 wt. % of the acrylic polymer. In some embodiments, the capstock includes 30 wt. % to 45 wt. % of the acrylic polymer. In some embodiments, the capstock includes 35 wt. % to 45 wt. % of the acrylic polymer. In some embodiments, the capstock includes 40 wt. % to 45 wt. % of the acrylic polymer.

In some embodiments, the capstock includes 1 wt. % to 40 wt. % of the acrylic polymer. In some embodiments, the capstock includes 2 wt. % to 40 wt. % of the acrylic polymer. In some embodiments, the capstock includes 3 wt. % to 40 wt. % of the acrylic polymer. In some embodiments, the capstock includes 4 wt. % to 40 wt. % of the acrylic polymer. In some embodiments, the capstock includes 5 wt. % to 40 wt. % of the acrylic polymer. In some embodiments, the capstock includes 10 wt. % to 40 wt. % of the acrylic polymer. In some embodiments, the capstock includes 15 wt. % to 40 wt. % of the acrylic polymer. In some embodiments, the capstock includes 20 wt. % to 40 wt. % of the acrylic polymer. In some embodiments, the capstock includes 25 wt. % to 40 wt. % of the acrylic polymer. In some embodiments, the capstock includes 30 wt. % to 40 wt. % of the acrylic polymer. In some embodiments, the capstock includes 35 wt. % to 40 wt. % of the acrylic polymer.

In some embodiments, the capstock includes 1 wt. % to 35 wt. % of the acrylic polymer. In some embodiments, the capstock includes 2 wt. % to 35 wt. % of the acrylic polymer. In some embodiments, the capstock includes 3 wt. % to 35 wt. % of the acrylic polymer. In some embodiments, the capstock includes 4 wt. % to 35 wt. % of the acrylic polymer. In some embodiments, the capstock includes 5 wt. % to 35 wt. % of the acrylic polymer. In some embodiments, the capstock includes 10 wt. % to 35 wt. % of the acrylic polymer. In some embodiments, the capstock includes 15 wt. % to 35 wt. % of the acrylic polymer. In some embodiments, the capstock includes 20 wt. % to 35 wt. % of the acrylic polymer. In some embodiments, the capstock includes 25 wt. % to 35 wt. % of the acrylic polymer. In some embodiments, the capstock includes 30 wt. % to 35 wt. % of the acrylic polymer.

In some embodiments, the capstock includes 1 wt. % to 30 wt. % of the acrylic polymer. In some embodiments, the capstock includes 2 wt. % to 30 wt. % of the acrylic polymer. In some embodiments, the capstock includes 3 wt. % to 30 wt. % of the acrylic polymer. In some embodiments, the capstock includes 4 wt. % to 30 wt. % of the acrylic polymer. In some embodiments, the capstock includes 5 wt. % to 30 wt. % of the acrylic polymer. In some embodiments, the capstock includes 10 wt. % to 30 wt. % of the acrylic polymer. In some embodiments, the capstock includes 15 wt. % to 30 wt. % of the acrylic polymer. In some embodiments, the capstock includes 20 wt. % to 30 wt. % of the acrylic polymer. In some embodiments, the capstock includes 25 wt. % to 30 wt. % of the acrylic polymer.

In some embodiments, the capstock includes 1 wt. % to 25 wt. % of the acrylic polymer. In some embodiments, the capstock includes 2 wt. % to 25 wt. % of the acrylic polymer. In some embodiments, the capstock includes 3 wt. % to 25 wt. % of the acrylic polymer. In some embodiments, the capstock includes 4 wt. % to 25 wt. % of the acrylic polymer. In some embodiments, the capstock includes 5 wt. % to 25 wt. % of the acrylic polymer. In some embodiments, the capstock includes 10 wt. % to 25 wt. % of the acrylic polymer. In some embodiments, the capstock includes 15 wt. % to 25 wt. % of the acrylic polymer. In some embodiments, the capstock includes 20 wt. % to 25 wt. % of the acrylic polymer.

In some embodiments, the capstock includes 1 wt. % to 20 wt. % of the acrylic polymer. In some embodiments, the capstock includes 2 wt. % to 20 wt. % of the acrylic polymer. In some embodiments, the capstock includes 3 wt. % to 20 wt. % of the acrylic polymer. In some embodiments, the capstock includes 4 wt. % to 20 wt. % of the acrylic polymer. In some embodiments, the capstock includes 5 wt. % to 20 wt. % of the acrylic polymer. In some embodiments, the capstock includes 10 wt. % to 20 wt. % of the acrylic polymer. In some embodiments, the capstock includes 15 wt. % to 20 wt. % of the acrylic polymer.

In some embodiments, the capstock includes 1 wt. % to 15 wt. % of the acrylic polymer. In some embodiments, the capstock includes 2 wt. % to 15 wt. % of the acrylic polymer. In some embodiments, the capstock includes 3 wt. % to 15 wt. % of the acrylic polymer. In some embodiments, the capstock includes 4 wt. % to 15 wt. % of the acrylic polymer. In some embodiments, the capstock includes 5 wt. % to 15 wt. % of the acrylic polymer. In some embodiments, the capstock includes 10 wt. % to 15 wt. % of the acrylic polymer.

In some embodiments, the capstock includes 1 wt. % to 10 wt. % of the acrylic polymer. In some embodiments, the capstock includes 2 wt. % to 10 wt. % of the acrylic polymer. In some embodiments, the capstock includes 3 wt. % to 10 wt. % of the acrylic polymer. In some embodiments, the capstock includes 4 wt. % to 10 wt. % of the acrylic polymer. In some embodiments, the capstock includes 5 wt. % to 10 wt. % of the acrylic polymer.

In some embodiments, the capstock includes 1 wt. % to 5 wt. % of the acrylic polymer. In some embodiments, the capstock includes 2 wt. % to 5 wt. % of the acrylic polymer. In some embodiments, the capstock includes 3 wt. % to 5 wt. % of the acrylic polymer. In some embodiments, the capstock includes 4 wt. % to 5 wt. % of the acrylic polymer.

In some embodiments, the capstock includes 1 wt. % to 4 wt. % of the acrylic polymer. In some embodiments, the capstock includes 2 wt. % to 4 wt. % of the acrylic polymer. In some embodiments, the capstock includes 3 wt. % to 4 wt. % of the acrylic polymer.

In some embodiments, the capstock includes 1 wt. % to 3 wt. % of the acrylic polymer. In some embodiments, the capstock includes 2 wt. % to 3 wt. % of the acrylic polymer. In some embodiments, the capstock includes 1 wt. % to 2 wt. % of the acrylic polymer.

In some embodiments, the weight percent of the acrylic polymer. In the capstock is 1 wt. % to 60 wt. % of the acrylic polymer. In some embodiments, the capstock includes 2 wt. % to 60 wt. % of the acrylic polymer. In some embodiments, the capstock includes 3 wt. % to 60 wt. % of the acrylic polymer. In some embodiments, the capstock includes 4 wt. % to 60 wt. % of the acrylic polymer. In some embodiments, the capstock includes 5 wt. % to 60 wt. % of the acrylic polymer. In some embodiments, the capstock includes 10 wt. % to 60 wt. % of the acrylic polymer. In some embodiments, the capstock includes 15 wt. % to 60 wt. % of the acrylic polymer. In some embodiments, the capstock includes 20 wt. % to 60 wt. % of the acrylic polymer. In some embodiments, the capstock includes 25 wt. % to 60 wt. % of the acrylic polymer. In some embodiments, the capstock includes 30 wt. % to 60 wt. % of the acrylic polymer. In some embodiments, the capstock includes 35 wt. % to 60 wt. % of the acrylic polymer. In some embodiments, the capstock includes 40 wt. % to 60 wt. % of the acrylic polymer. In some embodiments, the capstock includes 45 wt. % to 60 wt. % of the acrylic polymer. In some embodiments, the capstock includes 50 wt. % to 60 wt. % of the acrylic polymer. In some embodiments, the capstock includes 55 wt. % to 60 wt. % of the acrylic polymer.

In some embodiments, the capstock includes 1 wt. % to 55 wt. % of the acrylic polymer. In some embodiments, the capstock includes 2 wt. % to 55 wt. % of the acrylic polymer. In some embodiments, the capstock includes 3 wt. % to 55 wt. % of the acrylic polymer. In some embodiments, the capstock includes 4 wt. % to 55 wt. % of the acrylic polymer. In some embodiments, the capstock includes 5 wt. % to 55 wt. % of the acrylic polymer. In some embodiments, the capstock includes 10 wt. % to 55 wt. % of the acrylic polymer. In some embodiments, the capstock includes 15 wt. % to 55 wt. % of the acrylic polymer. In some embodiments, the capstock includes 20 wt. % to 55 wt. % of the acrylic polymer. In some embodiments, the capstock includes 25 wt. % to 55 wt. % of the acrylic polymer. In some embodiments, the capstock includes 30 wt. % to 55 wt. % of the acrylic polymer. In some embodiments, the capstock includes 35 wt. % to 55 wt. % of the acrylic polymer. In some embodiments, the capstock includes 40 wt. % to 55 wt. % of the acrylic polymer. In some embodiments, the capstock includes 45 wt. % to 55 wt. % of the acrylic polymer. In some embodiments, the capstock includes 50 wt. % to 55 wt. % of the acrylic polymer.

In some embodiments, the capstock includes 1 wt. % to 50 wt. % of the acrylic polymer. In some embodiments, the capstock includes 2 wt. % to 50 wt. % of the acrylic polymer. In some embodiments, the capstock includes 3 wt. % to 50 wt. % of the acrylic polymer. In some embodiments, the capstock includes 4 wt. % to 50 wt. % of the acrylic polymer. In some embodiments, the capstock includes 5 wt. % to 50 wt. % of the acrylic polymer. In some embodiments, the capstock includes 10 wt. % to 50 wt. % of the acrylic polymer. In some embodiments, the capstock includes 15 wt. % to 50 wt. % of the acrylic polymer. In some embodiments, the capstock includes 20 wt. % to 50 wt. % of the acrylic polymer. In some embodiments, the capstock includes 25 wt. % to 50 wt. % of the acrylic polymer. In some embodiments, the capstock includes 30 wt. % to 50 wt. % of the acrylic polymer. In some embodiments, the capstock includes 35 wt. % to 50 wt. % of the acrylic polymer. In some embodiments, the capstock includes 40 wt. % to 50 wt. % of the acrylic polymer. In some embodiments, the capstock includes 45 wt. % to 50 wt. % of the acrylic polymer.

In some embodiments, the capstock includes 1 wt. % to 45 wt. % of the acrylic polymer. In some embodiments, the capstock includes 2 wt. % to 45 wt. % of the acrylic polymer. In some embodiments, the capstock includes 3 wt. % to 45 wt. % of the acrylic polymer. In some embodiments, the capstock includes 4 wt. % to 45 wt. % of the acrylic polymer.

In some embodiments, the capstock includes 5 wt. % to 45 wt. % of the acrylic polymer. In some embodiments, the capstock includes 10 wt. % to 45 wt. % of the acrylic polymer. In some embodiments, the capstock includes 15 wt. % to 45 wt. % of the acrylic polymer. In some embodiments, the capstock includes 20 wt. % to 45 wt. % of the acrylic polymer. In some embodiments, the capstock includes 25 wt. % to 45 wt. % of the acrylic polymer. In some embodiments, the capstock includes 30 wt. % to 45 wt. % of the acrylic polymer. In some embodiments, the capstock includes 35 wt. % to 45 wt. % of the acrylic polymer. In some embodiments, the capstock includes 40 wt. % to 45 wt. % of the acrylic polymer.

In some embodiments, the capstock includes 1 wt. % to 40 wt. % of the acrylic polymer. In some embodiments, the capstock includes 2 wt. % to 40 wt. % of the acrylic polymer. In some embodiments, the capstock includes 3 wt. % to 40 wt. % of the acrylic polymer. In some embodiments, the capstock includes 4 wt. % to 40 wt. % of the acrylic polymer. In some embodiments, the capstock includes 5 wt. % to 40 wt. % of the acrylic polymer. In some embodiments, the capstock includes 10 wt. % to 40 wt. % of the acrylic polymer. In some embodiments, the capstock includes 15 wt. % to 40 wt. % of the acrylic polymer. In some embodiments, the capstock includes 20 wt. % to 40 wt. % of the acrylic polymer. In some embodiments, the capstock includes 25 wt. % to 40 wt. % of the acrylic polymer. In some embodiments, the capstock includes 30 wt. % to 40 wt. % of the acrylic polymer. In some embodiments, the capstock includes 35 wt. % to 40 wt. % of the acrylic polymer.

In some embodiments, the capstock includes 1 wt. % to 35 wt. % of the acrylic polymer. In some embodiments, the capstock includes 2 wt. % to 35 wt. % of the acrylic polymer. In some embodiments, the capstock includes 3 wt. % to 35 wt. % of the acrylic polymer. In some embodiments, the capstock includes 4 wt. % to 35 wt. % of the acrylic polymer. In some embodiments, the capstock includes 5 wt. % to 35 wt. % of the acrylic polymer. In some embodiments, the capstock includes 10 wt. % to 35 wt. % of the acrylic polymer. In some embodiments, the capstock includes 15 wt. % to 35 wt. % of the acrylic polymer. In some embodiments, the capstock includes 20 wt. % to 35 wt. % of the acrylic polymer. In some embodiments, the capstock includes 25 wt. % to 35 wt. % of the acrylic polymer. In some embodiments, the capstock includes 30 wt. % to 35 wt. % of the acrylic polymer.

In some embodiments, the capstock includes 1 wt. % to 30 wt. % of the acrylic polymer. In some embodiments, the capstock includes 2 wt. % to 30 wt. % of the acrylic polymer. In some embodiments, the capstock includes 3 wt. % to 30 wt. % of the acrylic polymer. In some embodiments, the capstock includes 4 wt. % to 30 wt. % of the acrylic polymer. In some embodiments, the capstock includes 5 wt. % to 30 wt. % of the acrylic polymer. In some embodiments, the capstock includes 10 wt. % to 30 wt. % of the acrylic polymer. In some embodiments, the capstock includes 15 wt. % to 30 wt. % of the acrylic polymer. In some embodiments, the capstock includes 20 wt. % to 30 wt. % of the acrylic polymer. In some embodiments, the capstock includes 25 wt. % to 30 wt. % of the acrylic polymer.

In some embodiments, the capstock includes 1 wt. % to 25 wt. % of the acrylic polymer. In some embodiments, the capstock includes 2 wt. % to 25 wt. % of the acrylic polymer. In some embodiments, the capstock includes 3 wt. % to 25 wt. % of the acrylic polymer. In some embodiments, the capstock includes 4 wt. % to 25 wt. % of the acrylic polymer. In some embodiments, the capstock includes 5 wt. % to 25 wt. % of the acrylic polymer. In some embodiments, the capstock includes 10 wt. % to 25 wt. % of the acrylic polymer. In some embodiments, the capstock includes 15 wt. % to 25 wt. % of the acrylic polymer. In some embodiments, the capstock includes 20 wt. % to 25 wt. % of the acrylic polymer.

In some embodiments, the capstock includes 1 wt. % to 20 wt. % of the acrylic polymer. In some embodiments, the capstock includes 2 wt. % to 20 wt. % of the acrylic polymer. In some embodiments, the capstock includes 3 wt. % to 20 wt. % of the acrylic polymer. In some embodiments, the capstock includes 4 wt. % to 20 wt. % of the acrylic polymer. In some embodiments, the capstock includes 5 wt. % to 20 wt. % of the acrylic polymer. In some embodiments, the capstock includes 10 wt. % to 20 wt. % of the acrylic polymer. In some embodiments, the capstock includes 15 wt. % to 20 wt. % of the acrylic polymer.

In some embodiments, the capstock includes 1 wt. % to 15 wt. % of the acrylic polymer. In some embodiments, the capstock includes 2 wt. % to 15 wt. % of the acrylic polymer. In some embodiments, the capstock includes 3 wt. % to 15 wt. % of the acrylic polymer. In some embodiments, the capstock includes 4 wt. % to 15 wt. % of the acrylic polymer. In some embodiments, the capstock includes 5 wt. % to 15 wt. % of the acrylic polymer. In some embodiments, the capstock includes 10 wt. % to 15 wt. % of the acrylic polymer.

In some embodiments, the capstock includes 1 wt. % to 10 wt. % of the acrylic polymer. In some embodiments, the capstock includes 2 wt. % to 10 wt. % of the acrylic polymer. In some embodiments, the capstock includes 3 wt. % to 10 wt. % of the acrylic polymer. In some embodiments, the capstock includes 4 wt. % to 10 wt. % of the acrylic polymer. In some embodiments, the capstock includes 5 wt. % to 10 wt. % of the acrylic polymer.

In some embodiments, the capstock includes 1 wt. % to 5 wt. % of the acrylic polymer. In some embodiments, the capstock includes 2 wt. % to 5 wt. % of the acrylic polymer. In some embodiments, the capstock includes 3 wt. % to 5 wt. % of the acrylic polymer. In some embodiments, the capstock includes 4 wt. % to 5 wt. % of the acrylic polymer.

In some embodiments, the capstock includes 1 wt. % to 4 wt. % of the acrylic polymer. In some embodiments, the capstock includes 2 wt. % to 4 wt. % of the acrylic polymer. In some embodiments, the capstock includes 3 wt. % to 4 wt. % of the acrylic polymer.

In some embodiments, the capstock includes 1 wt. % to 3 wt. % of the acrylic polymer. In some embodiments, the capstock includes 2 wt. % to 3 wt. % of the acrylic polymer. In some embodiments, the capstock includes 1 wt. % to 2 wt. % of the acrylic polymer.

Styrene-Acrylonitrile (SAN)

As stated, in some embodiments, the capstock includes SAN. In some embodiments, the SAN includes a cross-linked SAN, and/or a high molecular weight SAN. In some embodiments, the SAN includes acrylonitrile.

In some embodiments, the SAN includes 1 wt. % to 60 wt. % a weight percent of acrylonitrile, based on a total weight of the SAN. In some embodiments, the SAN includes 2 wt. % to 60 wt. % of the acrylonitrile. In some embodiments, the SAN includes 3 wt. % to 60 wt. % of the acrylonitrile. In some embodiments, the SAN includes 4 wt. % to 60 wt. % of the acrylonitrile. In some embodiments, the SAN includes 5 wt. % to 60 wt. % of the acrylonitrile. In some embodiments, the SAN includes 10 wt. % to 60 wt. % of the acrylonitrile. In some embodiments, the SAN includes 15 wt. % to 60 wt. % of the acrylonitrile. In some embodiments, the SAN includes 20 wt. % to 60 wt. % of the acrylonitrile. In some embodiments, the SAN includes 25 wt. % to 60 wt. % of the acrylonitrile. In some embodiments, the SAN includes 30 wt. % to 60 wt. % of the acrylonitrile. In some embodiments, the SAN includes 35 wt. % to 60 wt. % of the acrylonitrile. In some embodiments, the SAN includes 40 wt. % to 60 wt. % of the acrylonitrile. In some embodiments, the SAN includes 45 wt. % to 60 wt. % of the acrylonitrile. In some embodiments, the SAN includes 50 wt. % to 60 wt. % of the acrylonitrile. In some embodiments, the SAN includes 55 wt. % to 60 wt. % of the acrylonitrile.

In some embodiments, the SAN includes 1 wt. % to 55 wt. % of the acrylonitrile. In some embodiments, the SAN includes 2 wt. % to 55 wt. % of the acrylonitrile. In some embodiments, the SAN includes 3 wt. % to 55 wt. % of the acrylonitrile. In some embodiments, the SAN includes 4 wt. % to 55 wt. % of the acrylonitrile. In some embodiments, the SAN includes 5 wt. % to 55 wt. % of the acrylonitrile. In some embodiments, the SAN includes 10 wt. % to 55 wt. % of the acrylonitrile. In some embodiments, the SAN includes 15 wt. % to 55 wt. % of the acrylonitrile. In some embodiments, the SAN includes 20 wt. % to 55 wt. % of the acrylonitrile. In some embodiments, the SAN includes 25 wt. % to 55 wt. % of the acrylonitrile. In some embodiments, the SAN includes 30 wt. % to 55 wt. % of the acrylonitrile. In some embodiments, the SAN includes 35 wt. % to 55 wt. % of the acrylonitrile. In some embodiments, the SAN includes 40 wt. % to 55 wt. % of the acrylonitrile. In some embodiments, the SAN includes 45 wt. % to 55 wt. % of the acrylonitrile. In some embodiments, the SAN includes 50 wt. % to 55 wt. % of the acrylonitrile.

In some embodiments, the SAN includes 1 wt. % to 50 wt. % of the acrylonitrile. In some embodiments, the SAN includes 2 wt. % to 50 wt. % of the acrylonitrile. In some embodiments, the SAN includes 3 wt. % to 50 wt. % of the acrylonitrile. In some embodiments, the SAN includes 4 wt. % to 50 wt. % of the acrylonitrile. In some embodiments, the SAN includes 5 wt. % to 50 wt. % of the acrylonitrile. In some embodiments, the SAN includes 10 wt. % to 50 wt. % of the acrylonitrile. In some embodiments, the SAN includes 15 wt. % to 50 wt. % of the acrylonitrile. In some embodiments, the SAN includes 20 wt. % to 50 wt. % of the acrylonitrile. In some embodiments, the SAN includes 25 wt. % to 50 wt. % of the acrylonitrile. In some embodiments, the SAN includes 30 wt. % to 50 wt. % of the acrylonitrile. In some embodiments, the SAN includes 35 wt. % to 50 wt. % of the acrylonitrile. In some embodiments, the SAN includes 40 wt. % to 50 wt. % of the acrylonitrile. In some embodiments, the SAN includes 45 wt. % to 50 wt. % of the acrylonitrile.

In some embodiments, the SAN includes 1 wt. % to 45 wt. % of the acrylonitrile. In some embodiments, the SAN includes 2 wt. % to 45 wt. % of the acrylonitrile. In some embodiments, the SAN includes 3 wt. % to 45 wt. % of the acrylonitrile. In some embodiments, the SAN includes 4 wt. % to 45 wt. % of the acrylonitrile. In some embodiments, the SAN includes 5 wt. % to 45 wt. % of the acrylonitrile. In some embodiments, the SAN includes 10 wt. % to 45 wt. % of the acrylonitrile. In some embodiments, the SAN includes 15 wt. % to 45 wt. % of the acrylonitrile. In some embodiments, the SAN includes 20 wt. % to 45 wt. % of the acrylonitrile. In some embodiments, the SAN includes 25 wt. % to 45 wt. % of the acrylonitrile. In some embodiments, the SAN includes 30 wt. % to 45 wt. % of the acrylonitrile. In some embodiments, the SAN includes 35 wt. % to 45 wt. % of the acrylonitrile. In some embodiments, the SAN includes 40 wt. % to 45 wt. % of the acrylonitrile.

In some embodiments, the SAN includes 1 wt. % to 40 wt. % of the acrylonitrile. In some embodiments, the SAN includes 2 wt. % to 40 wt. % of the acrylonitrile. In some embodiments, the SAN includes 3 wt. % to 40 wt. % of the acrylonitrile. In some embodiments, the SAN includes 4 wt. % to 40 wt. % of the acrylonitrile. In some embodiments, the SAN includes 5 wt. % to 40 wt. % of the acrylonitrile. In some embodiments, the SAN includes 10 wt. % to 40 wt. % of the acrylonitrile. In some embodiments, the SAN includes 15 wt. % to 40 wt. % of the acrylonitrile. In some embodiments, the SAN includes 20 wt. % to 40 wt. % of the acrylonitrile. In some embodiments, the SAN includes 25 wt. % to 40 wt. % of the acrylonitrile. In some embodiments, the SAN includes 30 wt. % to 40 wt. % of the acrylonitrile. In some embodiments, the SAN includes 35 wt. % to 40 wt. % of the acrylonitrile.

In some embodiments, the SAN includes 1 wt. % to 35 wt. % of the acrylonitrile. In some embodiments, the SAN includes 2 wt. % to 35 wt. % of the acrylonitrile. In some embodiments, the SAN includes 3 wt. % to 35 wt. % of the acrylonitrile. In some embodiments, the SAN includes 4 wt. % to 35 wt. % of the acrylonitrile. In some embodiments, the SAN includes 5 wt. % to 35 wt. % of the acrylonitrile. In some embodiments, the SAN includes 10 wt. % to 35 wt. % of the acrylonitrile. In some embodiments, the SAN includes 15 wt. % to 35 wt. % of the acrylonitrile. In some embodiments, the SAN includes 20 wt. % to 35 wt. % of the acrylonitrile. In some embodiments, the SAN includes 25 wt. % to 35 wt. % of the acrylonitrile. In some embodiments, the SAN includes 30 wt. % to 35 wt. % of the acrylonitrile.

In some embodiments, the SAN includes 1 wt. % to 30 wt. % of the acrylonitrile. In some embodiments, the SAN includes 2 wt. % to 30 wt. % of the acrylonitrile. In some embodiments, the SAN includes 3 wt. % to 30 wt. % of the acrylonitrile. In some embodiments, the SAN includes 4 wt. % to 30 wt. % of the acrylonitrile. In some embodiments, the SAN includes 5 wt. % to 30 wt. % of the acrylonitrile. In some embodiments, the SAN includes 10 wt. % to 30 wt. % of the acrylonitrile. In some embodiments, the SAN includes 15 wt. % to 30 wt. % of the acrylonitrile. In some embodiments, the SAN includes 20 wt. % to 30 wt. % of the acrylonitrile. In some embodiments, the SAN includes 25 wt. % to 30 wt. % of the acrylonitrile.

In some embodiments, the SAN includes 1 wt. % to 25 wt. % of the acrylonitrile. In some embodiments, the SAN includes 2 wt. % to 25 wt. % of the acrylonitrile. In some embodiments, the SAN includes 3 wt. % to 25 wt. % of the acrylonitrile. In some embodiments, the SAN includes 4 wt. % to 25 wt. % of the acrylonitrile. In some embodiments, the SAN includes 5 wt. % to 25 wt. % of the acrylonitrile. In some embodiments, the SAN includes 10 wt. % to 25 wt. % of the acrylonitrile. In some embodiments, the SAN includes 15 wt. % to 25 wt. % of the acrylonitrile. In some embodiments, the SAN includes 20 wt. % to 25 wt. % of the acrylonitrile.

In some embodiments, the SAN includes 1 wt. % to 20 wt. % of the acrylonitrile. In some embodiments, the SAN includes 2 wt. % to 20 wt. % of the acrylonitrile. In some embodiments, the SAN includes 3 wt. % to 20 wt. % of the acrylonitrile. In some embodiments, the SAN includes 4 wt. % to 20 wt. % of the acrylonitrile. In some embodiments, the SAN includes 5 wt. % to 20 wt. % of the acrylonitrile. In some embodiments, the SAN includes 10 wt. % to 20 wt. % of the acrylonitrile. In some embodiments, the SAN includes 15 wt. % to 20 wt. % of the acrylonitrile.

In some embodiments, the SAN includes 1 wt. % to 15 wt. % of the acrylonitrile. In some embodiments, the SAN includes 2 wt. % to 15 wt. % of the acrylonitrile. In some embodiments, the SAN includes 3 wt. % to 15 wt. % of the acrylonitrile. In some embodiments, the SAN includes 4 wt. % to 15 wt. % of the acrylonitrile. In some embodiments, the SAN includes 5 wt. % to 15 wt. % of the acrylonitrile. In some embodiments, the SAN includes 10 wt. % to 15 wt. % of the acrylonitrile.

In some embodiments, the SAN includes 1 wt. % to 10 wt. % of the acrylonitrile. In some embodiments, the SAN includes 2 wt. % to 10 wt. % of the acrylonitrile. In some embodiments, the SAN includes 3 wt. % to 10 wt. % of the acrylonitrile. In some embodiments, the SAN includes 4 wt. % to 10 wt. % of the acrylonitrile. In some embodiments, the SAN includes 5 wt. % to 10 wt. % of the acrylonitrile.

In some embodiments, the SAN includes 1 wt. % to 5 wt. % of the acrylonitrile. In some embodiments, the SAN includes 2 wt. % to 5 wt. % of the acrylonitrile. In some embodiments, the SAN includes 3 wt. % to 5 wt. % of the acrylonitrile. In some embodiments, the SAN includes 4 wt. % to 5 wt. % of the acrylonitrile.

In some embodiments, the SAN includes 1 wt. % to 4 wt. % of the acrylonitrile. In some embodiments, the SAN includes 2 wt. % to 4 wt. % of the acrylonitrile. In some embodiments, the SAN includes 3 wt. % to 4 wt. % of the acrylonitrile.

In some embodiments, the SAN includes 1 wt. % to 3 wt. % of the acrylonitrile. In some embodiments, the SAN includes 2 wt. % to 3 wt. % of the acrylonitrile. In some embodiments, the SAN includes 1 wt. % to 2 wt. % of the acrylonitrile.

In some embodiments, the capstock includes 1 wt. % to 60 wt. % of a weight percent of SAN, based on a total weight of the capstock. In some embodiments, the capstock includes 2 wt. % to 60 wt. % of SAN. In some embodiments, the capstock includes 3 wt. % to 60 wt. % of SAN. In some embodiments, the capstock includes 4 wt. % to 60 wt. % of SAN. In some embodiments, the capstock includes 5 wt. % to 60 wt. % of SAN. In some embodiments, the capstock includes 10 wt. % to 60 wt. % of SAN. In some embodiments, the capstock includes 15 wt. % to 60 wt. % of SAN. In some embodiments, the capstock includes 20 wt. % to 60 wt. % of SAN. In some embodiments, the capstock includes 25 wt. % to 60 wt. % of SAN. In some embodiments, the capstock includes 30 wt. % to 60 wt. % of SAN. In some embodiments, the capstock includes 35 wt. % to 60 wt. % of SAN. In some embodiments, the capstock includes 40 wt. % to 60 wt. % of SAN. In some embodiments, the capstock includes 45 wt. % to 60 wt. % of SAN. In some embodiments, the capstock includes 50 wt. % to 60 wt. % of SAN. In some embodiments, the capstock includes 55 wt. % to 60 wt. % of SAN.

In some embodiments, the capstock includes 1 wt. % to 55 wt. % of SAN. In some embodiments, the capstock includes 2 wt. % to 55 wt. % of SAN. In some embodiments, the capstock includes 3 wt. % to 55 wt. % of SAN. In some embodiments, the capstock includes 4 wt. % to 55 wt. % of SAN. In some embodiments, the capstock includes 5 wt. % to 55 wt. % of SAN. In some embodiments, the capstock includes 10 wt. % to 55 wt. % of SAN. In some embodiments, the capstock includes 15 wt. % to 55 wt. % of SAN. In some embodiments, the capstock includes 20 wt. % to 55 wt. % of SAN. In some embodiments, the capstock includes 25 wt. % to 55 wt. % of SAN. In some embodiments, the capstock includes 30 wt. % to 55 wt. % of SAN. In some embodiments, the capstock includes 35 wt. % to 55 wt. % of SAN. In some embodiments, the capstock includes 40 wt. % to 55 wt. % of SAN. In some embodiments, the capstock includes 45 wt. % to 55 wt. % of SAN. In some embodiments, the capstock includes 50 wt. % to 55 wt. % of SAN.

In some embodiments, the capstock includes 1 wt. % to 50 wt. % of SAN. In some embodiments, the capstock includes 2 wt. % to 50 wt. % of SAN. In some embodiments, the capstock includes 3 wt. % to 50 wt. % of SAN. In some embodiments, the capstock includes 4 wt. % to 50 wt. % of SAN. In some embodiments, the capstock includes 5 wt. % to 50 wt. % of SAN. In some embodiments, the capstock includes 10 wt. % to 50 wt. % of SAN. In some embodiments, the capstock includes 15 wt. % to 50 wt. % of SAN. In some embodiments, the capstock includes 20 wt. % to 50 wt. % of SAN. In some embodiments, the capstock includes 25 wt. % to 50 wt. % of SAN. In some embodiments, the capstock includes 30 wt. % to 50 wt. % of SAN. In some embodiments, the capstock includes 35 wt. % to 50 wt. % of SAN. In some embodiments, the capstock includes 40 wt. % to 50 wt. % of SAN. In some embodiments, the capstock includes 45 wt. % to 50 wt. % of SAN.

In some embodiments, the capstock includes 1 wt. % to 45 wt. % of SAN. In some embodiments, the capstock includes 2 wt. % to 45 wt. % of SAN. In some embodiments, the capstock includes 3 wt. % to 45 wt. % of SAN. In some embodiments, the capstock includes 4 wt. % to 45 wt. % of SAN. In some embodiments, the capstock includes 5 wt. % to 45 wt. % of SAN. In some embodiments, the capstock includes 10 wt. % to 45 wt. % of SAN. In some embodiments, the capstock includes 15 wt. % to 45 wt. % of SAN. In some embodiments, the capstock includes 20 wt. % to 45 wt. % of SAN. In some embodiments, the capstock includes 25 wt. % to 45 wt. % of SAN. In some embodiments, the capstock includes 30 wt. % to 45 wt. % of SAN. In some embodiments, the capstock includes 35 wt. % to 45 wt. % of SAN. In some embodiments, the capstock includes 40 wt. % to 45 wt. % of SAN.

In some embodiments, the capstock includes 1 wt. % to 40 wt. % of SAN. In some embodiments, the capstock includes 2 wt. % to 40 wt. % of SAN. In some embodiments, the capstock includes 3 wt. % to 40 wt. % of SAN. In some embodiments, the capstock includes 4 wt. % to 40 wt. % of SAN. In some embodiments, the capstock includes 5 wt. % to 40 wt. % of SAN. In some embodiments, the capstock includes 10 wt. % to 40 wt. % of SAN. In some embodiments, the capstock includes 15 wt. % to 40 wt. % of SAN. In some embodiments, the capstock includes 20 wt. % to 40 wt. % of SAN. In some embodiments, the capstock includes 25 wt. % to 40 wt. % of SAN. In some embodiments, the capstock includes 30 wt. % to 40 wt. % of SAN. In some embodiments, the capstock includes 35 wt. % to 40 wt. % of SAN.

In some embodiments, the capstock includes 1 wt. % to 35 wt. % of SAN. In some embodiments, the capstock includes 2 wt. % to 35 wt. % of SAN. In some embodiments, the capstock includes 3 wt. % to 35 wt. % of SAN. In some embodiments, the capstock includes 4 wt. % to 35 wt. % of SAN. In some embodiments, the capstock includes 5 wt. % to 35 wt. % of SAN. In some embodiments, the capstock includes 10 wt. % to 35 wt. % of SAN. In some embodiments, the capstock includes 15 wt. % to 35 wt. % of SAN. In some embodiments, the capstock includes 20 wt. % to 35 wt. % of SAN. In some embodiments, the capstock includes 25 wt. % to 35 wt. % of SAN. In some embodiments, the capstock includes 30 wt. % to 35 wt. % of SAN.

In some embodiments, the capstock includes 1 wt. % to 30 wt. % of SAN. In some embodiments, the capstock includes 2 wt. % to 30 wt. % of SAN. In some embodiments, the capstock includes 3 wt. % to 30 wt. % of SAN. In some embodiments, the capstock includes 4 wt. % to 30 wt. % of SAN. In some embodiments, the capstock includes 5 wt. % to 30 wt. % of SAN. In some embodiments, the capstock includes 10 wt. % to 30 wt. % of SAN. In some embodiments, the capstock includes 15 wt. % to 30 wt. % of SAN. In some embodiments, the capstock includes 20 wt. % to 30 wt. % of SAN. In some embodiments, the capstock includes 25 wt. % to 30 wt. % of SAN.

In some embodiments, the capstock includes 1 wt. % to 25 wt. % of SAN. In some embodiments, the capstock includes 2 wt. % to 25 wt. % of SAN. In some embodiments, the capstock includes 3 wt. % to 25 wt. % of SAN. In some embodiments, the capstock includes 4 wt. % to 25 wt. % of SAN. In some embodiments, the capstock includes 5 wt. % to 25 wt. % of SAN. In some embodiments, the capstock includes 10 wt. % to 25 wt. % of SAN. In some embodiments, the capstock includes 15 wt. % to 25 wt. % of SAN. In some embodiments, the capstock includes 20 wt. % to 25 wt. % of SAN.

In some embodiments, the capstock includes 1 wt. % to 20 wt. % of SAN. In some embodiments, the capstock includes 2 wt. % to 20 wt. % of SAN. In some embodiments, the capstock includes 3 wt. % to 20 wt. % of SAN. In some embodiments, the capstock includes 4 wt. % to 20 wt. % of SAN. In some embodiments, the capstock includes 5 wt. % to 20 wt. % of SAN. In some embodiments, the capstock includes 10 wt. % to 20 wt. % of SAN. In some embodiments, the capstock includes 15 wt. % to 20 wt. % of SAN.

In some embodiments, the capstock includes 1 wt. % to 15 wt. % of SAN. In some embodiments, the capstock includes 2 wt. % to 15 wt. % of SAN. In some embodiments, the capstock includes 3 wt. % to 15 wt. % of SAN. In some embodiments, the capstock includes 4 wt. % to 15 wt. % of SAN. In some embodiments, the capstock includes 5 wt. % to 15 wt. % of SAN. In some embodiments, the capstock includes 10 wt. % to 15 wt. % of SAN.

In some embodiments, the capstock includes 1 wt. % to 10 wt. % of SAN. In some embodiments, the capstock includes 2 wt. % to 10 wt. % of SAN. In some embodiments, the capstock includes 3 wt. % to 10 wt. % of SAN. In some embodiments, the capstock includes 4 wt. % to 10 wt. % of SAN. In some embodiments, the capstock includes 5 wt. % to 10 wt. % of SAN.

In some embodiments, the capstock includes 1 wt. % to 5 wt. % of SAN. In some embodiments, the capstock includes 2 wt. % to 5 wt. % of SAN. In some embodiments, the capstock includes 3 wt. % to 5 wt. % of SAN. In some embodiments, the capstock includes 4 wt. % to 5 wt. % of SAN.

In some embodiments, the capstock includes 1 wt. % to 4 wt. % of SAN. In some embodiments, the capstock includes 2 wt. % to 4 wt. % of SAN. In some embodiments, the capstock includes 3 wt. % to 4 wt. % of SAN.

In some embodiments, the capstock includes 1 wt. % to 3 wt. % of SAN. In some embodiments, the capstock includes 2 wt. % to 3 wt. % of SAN. In some embodiments, the capstock includes 1 wt. % to 2 wt. % of SAN.

Thermoplastic Polyurethane (TPU)

As set forth, in some embodiments, the capstock includes thermoplastic polyurethane (TPU) and another thermoplastic elastomer other than TPU. In some embodiments, the TPU includes an ether TPU grade and/or an ester TPU grade. In some embodiments, the TPU includes an aliphatic TPU and/or an aromatic TPU.

In some embodiments, the capstock includes 1 wt. % to 50 wt. % of TPU, based on a total weight of the capstock. In some embodiments, the capstock includes 2 wt. % to 50 wt. % of TPU. In some embodiments, the capstock includes 3 wt. % to 50 wt. % of TPU. In some embodiments, the capstock includes 4 wt. % to 50 wt. % of TPU. In some embodiments, the capstock includes 5 wt. % to 50 wt. % of TPU. In some embodiments, the capstock includes 10 wt. % to 50 wt. % of TPU. In some embodiments, the capstock includes 15 wt. % to 50 wt. % of TPU. In some embodiments, the capstock includes 20 wt. % to 50 wt. % of TPU. In some embodiments, the capstock includes 25 wt. % to 50 wt. % of TPU. In some embodiments, the capstock includes 30 wt. % to 50 wt. % of TPU. In some embodiments, the capstock includes 35 wt. % to 50 wt. % of TPU. In some embodiments, the capstock includes 40 wt. % to 50 wt. % of TPU. In some embodiments, the capstock includes 45 wt. % to 50 wt. % of TPU.

In some embodiments, the capstock includes 1 wt. % to 45 wt. % of TPU. In some embodiments, the capstock includes 2 wt. % to 45 wt. % of TPU. In some embodiments, the capstock includes 3 wt. % to 45 wt. % of TPU. In some embodiments, the capstock includes 4 wt. % to 45 wt. % of TPU. In some embodiments, the capstock includes 5 wt. % to 45 wt. % of TPU. In some embodiments, the capstock includes 10 wt. % to 45 wt. % of TPU. In some embodiments, the capstock includes 15 wt. % to 45 wt. % of TPU. In some embodiments, the capstock includes 20 wt. % to 45 wt. % of TPU. In some embodiments, the capstock includes 25 wt. % to 45 wt. % of TPU. In some embodiments, the capstock includes 30 wt. % to 45 wt. % of TPU. In some embodiments, the capstock includes 35 wt. % to 45 wt. % of TPU. In some embodiments, the capstock includes 40 wt. % to 45 wt. % of TPU.

In some embodiments, the capstock includes 1 wt. % to 40 wt. % of TPU. In some embodiments, the capstock includes 2 wt. % to 40 wt. % of TPU. In some embodiments, the capstock includes 3 wt. % to 40 wt. % of TPU. In some embodiments, the capstock includes 4 wt. % to 40 wt. % of TPU. In some embodiments, the capstock includes 5 wt. % to 40 wt. % of TPU. In some embodiments, the capstock includes 10 wt. % to 40 wt. % of TPU. In some embodiments, the capstock includes 15 wt. % to 40 wt. % of TPU. In some embodiments, the capstock includes 20 wt. % to 40 wt. % of TPU. In some embodiments, the capstock includes 25 wt. % to 40 wt. % of TPU. In some embodiments, the capstock includes 30 wt. % to 40 wt. % of TPU. In some embodiments, the capstock includes 35 wt. % to 40 wt. % of TPU.

In some embodiments, the capstock includes 1 wt. % to 35 wt. % of TPU. In some embodiments, the capstock includes 2 wt. % to 35 wt. % of TPU. In some embodiments, the capstock includes 3 wt. % to 35 wt. % of TPU. In some embodiments, the capstock includes 4 wt. % to 35 wt. % of TPU. In some embodiments, the capstock includes 5 wt. % to 35 wt. % of TPU. In some embodiments, the capstock includes 10 wt. % to 35 wt. % of TPU. In some embodiments, the capstock includes 15 wt. % to 35 wt. % of TPU. In some embodiments, the capstock includes 20 wt. % to 35 wt. % of TPU. In some embodiments, the capstock includes 25 wt. % to 35 wt. % of TPU. In some embodiments, the capstock includes 30 wt. % to 35 wt. % of TPU.

In some embodiments, the capstock includes 1 wt. % to 30 wt. % of TPU. In some embodiments, the capstock includes 2 wt. % to 30 wt. % of TPU. In some embodiments, the capstock includes 3 wt. % to 30 wt. % of TPU. In some embodiments, the capstock includes 4 wt. % to 30 wt. % of TPU. In some embodiments, the capstock includes 5 wt. % to 30 wt. % of TPU. In some embodiments, the capstock includes 10 wt. % to 30 wt. % of TPU. In some embodiments, the capstock includes 15 wt. % to 30 wt. % of TPU. In some embodiments, the capstock includes 20 wt. % to 30 wt. % of TPU. In some embodiments, the capstock includes 25 wt. % to 30 wt. % of TPU.

In some embodiments, the capstock includes 1 wt. % to 25 wt. % of TPU. In some embodiments, the capstock includes 2 wt. % to 25 wt. % of TPU. In some embodiments, the capstock includes 3 wt. % to 25 wt. % of TPU. In some embodiments, the capstock includes 4 wt. % to 25 wt. % of TPU. In some embodiments, the capstock includes 5 wt. % to 25 wt. % of TPU. In some embodiments, the capstock includes 10 wt. % to 25 wt. % of TPU. In some embodiments, the capstock includes 15 wt. % to 25 wt. % of TPU. In some embodiments, the capstock includes 20 wt. % to 25 wt. % of TPU.

In some embodiments, the capstock includes 1 wt. % to 20 wt. % of TPU. In some embodiments, the capstock includes 2 wt. % to 20 wt. % of TPU. In some embodiments, the capstock includes 3 wt. % to 20 wt. % of TPU. In some embodiments, the capstock includes 4 wt. % to 20 wt. % of TPU. In some embodiments, the capstock includes 5 wt. % to 20 wt. % of TPU. In some embodiments, the capstock includes 10 wt. % to 20 wt. % of TPU. In some embodiments, the capstock includes 15 wt. % to 20 wt. % of TPU.

In some embodiments, the capstock includes 1 wt. % to 15 wt. % of TPU. In some embodiments, the capstock includes 2 wt. % to 15 wt. % of TPU. In some embodiments, the capstock includes 3 wt. % to 15 wt. % of TPU. In some embodiments, the capstock includes 4 wt. % to 15 wt. % of TPU. In some embodiments, the capstock includes 5 wt. % to 15 wt. % of TPU. In some embodiments, the capstock includes 10 wt. % to 15 wt. % of TPU.

In some embodiments, the capstock includes 1 wt. % to 10 wt. % of TPU. In some embodiments, the capstock includes 2 wt. % to 10 wt. % of TPU. In some embodiments, the capstock includes 3 wt. % to 10 wt. % of TPU. In some embodiments, the capstock includes 4 wt. % to 10 wt. % of TPU. In some embodiments, the capstock includes 5 wt. % to 10 wt. % of TPU.

In some embodiments, the capstock includes 1 wt. % to 5 wt. % of TPU. In some embodiments, the capstock includes 2 wt. % to 5 wt. % of TPU. In some embodiments, the capstock includes 3 wt. % to 5 wt. % of TPU. In some embodiments, the capstock includes 4 wt. % to 5 wt. % of TPU.

In some embodiments, the capstock includes 1 wt. % to 4 wt. % of TPU. In some embodiments, the capstock includes 2 wt. % to 4 wt. % of TPU. In some embodiments, the capstock includes 3 wt. % to 4 wt. % of TPU.

In some embodiments, the capstock includes 1 wt. % to 3 wt. % of TPU. In some embodiments, the capstock includes 2 wt. % to 3 wt. % of TPU. In some embodiments, the capstock includes 1 wt. % to 2 wt. % of TPU.

In some embodiments, the capstock does not include TPU.

Thermoplastic Elastomer Other than TPU

As stated, in some embodiments, the capstock includes a thermoplastic elastomer other than TPU. In some embodiments, the capstock includes both TPU and a thermoplastic elastomer other than TPU. In some embodiments, the thermoplastic elastomer includes styrene-isobutylene-styrene (SIBS). In some embodiments, the thermoplastic elastomer includes SIBS and styrene-isobutylene (SIB). In some embodiments, the thermoplastic elastomer includes a tri-block type SIBS. In some embodiments, the thermoplastic elastomer includes a di-block type SIB. In some embodiments, the thermoplastic elastomer includes a tri-block type SIBS and a di-block type SIB. In some embodiments, the thermoplastic elastomer includes a thermoplastic copolyester elastomer. In some embodiments, the thermoplastic elastomer includes a thermoplastic ether ester elastomer. In some embodiments, the thermoplastic elastomer includes a terpolymer. In some embodiments, the thermoplastic elastomer includes a ketone ethylene ester terpolymer.

In some embodiments, the capstock includes 1 wt. % to 30 wt. % of a thermoplastic other than TPU, based on a total weight of the capstock, regardless of whether the capstock does or does not include TPU. In some embodiments, the capstock includes 2 wt. % to 30 wt. % of the thermoplastic other than TPU. In some embodiments, the capstock includes 3 wt. % to 30 wt. % of the thermoplastic other than TPU. In some embodiments, the capstock includes 4 wt. % to 30 wt. % of the thermoplastic other than TPU. In some embodiments, the capstock includes 5 wt. % to 30 wt. % of the thermoplastic other than TPU. In some embodiments, the capstock includes 6 wt. % to 30 wt. % of the thermoplastic other than TPU. In some embodiments, the capstock includes 7 wt. % to 30 wt. % of the thermoplastic other than TPU. In some embodiments, the capstock includes 8 wt. % to 30 wt. % of the thermoplastic other than TPU. In some embodiments, the capstock includes 9 wt. % to 30 wt. % of the thermoplastic other than TPU. In some embodiments, the capstock includes 10 wt. % to 30 wt. % of the thermoplastic other than TPU. In some embodiments, the capstock includes 11 wt. % to 30 wt. % of the thermoplastic other than TPU. In some embodiments, the capstock includes 12 wt. % to 30 wt. % of the thermoplastic other than TPU. In some embodiments, the capstock includes 13 wt. % to 30 wt. % of the thermoplastic other than TPU. In some embodiments, the capstock includes 14 wt. % to 30 wt. % of the thermoplastic other than TPU. In some embodiments, the capstock includes 15 wt. % to 30 wt. % of the thermoplastic other than TPU. In some embodiments, the capstock includes 16 wt. % to 30 wt. % of the thermoplastic other than TPU. In some embodiments, the capstock includes 17 wt. % to 30 wt. % of the thermoplastic other than TPU. In some embodiments, the capstock includes 18 wt. % to 30 wt. % of the thermoplastic other than TPU. In some embodiments, the capstock includes 19 wt. % to 30 wt. % of the thermoplastic other than TPU. In some embodiments, the capstock includes 20 wt. % to 30 wt. % of the thermoplastic other than TPU. In some embodiments, the capstock includes 21 wt. % to 30 wt. % of the thermoplastic other than TPU. In some embodiments, the capstock includes 22 wt. % to 30 wt. % of the thermoplastic other than TPU. In some embodiments, the capstock includes 23 wt. % to 30 wt. % of the thermoplastic other than TPU. In some embodiments, the capstock includes 24 wt. % to 30 wt. % of the thermoplastic other than TPU. In some embodiments, the capstock includes 25 wt. % to 30 wt. % of the thermoplastic other than TPU.

In some embodiments, the capstock includes 1 wt. % to 25 wt. % of the thermoplastic other than TPU. In some embodiments, the capstock includes 2 wt. % to 25 wt. % of the thermoplastic other than TPU. In some embodiments, the capstock includes 3 wt. % to 25 wt. % of the thermoplastic other than TPU. In some embodiments, the capstock includes 4 wt. % to 25 wt. % of the thermoplastic other than TPU. In some embodiments, the capstock includes 5 wt. % to 25 wt. % of the thermoplastic other than TPU. In some embodiments, the capstock includes 6 wt. % to 25 wt. % of the thermoplastic other than TPU. In some embodiments, the capstock includes 7 wt. % to 25 wt. % of the thermoplastic other than TPU. In some embodiments, the capstock includes 8 wt. % to 25 wt. % of the thermoplastic other than TPU. In some embodiments, the capstock includes 9 wt. % to 25 wt. % of the thermoplastic other than TPU. In some embodiments, the capstock includes 10 wt. % to 25 wt. % of the thermoplastic other than TPU. In some embodiments, the capstock includes 11 wt. % to 25 wt. % of the thermoplastic other than TPU. In some embodiments, the capstock includes 12 wt. % to 25 wt. % of the thermoplastic other than TPU. In some embodiments, the capstock includes 13 wt. % to 25 wt. % of the thermoplastic other than TPU. In some embodiments, the capstock includes 14 wt. % to 25 wt. % of the thermoplastic other than TPU. In some embodiments, the capstock includes 15 wt. % to 25 wt. % of the thermoplastic other than TPU. In some embodiments, the capstock includes 16 wt. % to 25 wt. % of the thermoplastic other than TPU. In some embodiments, the capstock includes 17 wt. % to 25 wt. % of the thermoplastic other than TPU. In some embodiments, the capstock includes 18 wt. % to 25 wt. % of the thermoplastic other than TPU. In some embodiments, the capstock includes 19 wt. % to 25 wt. % of the thermoplastic other than TPU. In some embodiments, the capstock includes 20 wt. % to 25 wt. % of the thermoplastic other than TPU. In some embodiments, the capstock includes 21 wt. % to 25 wt. % of the thermoplastic other than TPU. In some embodiments, the capstock includes 22 wt. % to 25 wt. % of the thermoplastic other than TPU. In some embodiments, the capstock includes 23 wt. % to 25 wt. % of the thermoplastic other than TPU. In some embodiments, the capstock includes 24 wt. % to 25 wt. % of the thermoplastic other than TPU.

In some embodiments, the capstock includes 1 wt. % to 24 wt. % of the thermoplastic other than TPU. In some embodiments, the capstock includes 2 wt. % to 24 wt. % of the thermoplastic other than TPU. In some embodiments, the capstock includes 3 wt. % to 24 wt. % of the thermoplastic other than TPU. In some embodiments, the capstock includes 4 wt. % to 24 wt. % of the thermoplastic other than TPU. In some embodiments, the capstock includes 5 wt. % to 24 wt. % of the thermoplastic other than TPU. In some embodiments, the capstock includes 6 wt. % to 24 wt. % of the thermoplastic other than TPU. In some embodiments, the capstock includes 7 wt. % to 24 wt. % of the thermoplastic other than TPU. In some embodiments, the capstock includes 8 wt. % to 24 wt. % of the thermoplastic other than TPU. In some embodiments, the capstock includes 9 wt. % to 24 wt. % of the thermoplastic other than TPU. In some embodiments, the capstock includes 10 wt. % to 24 wt. % of the thermoplastic other than TPU. In some embodiments, the capstock includes 11 wt. % to 24 wt. % of the thermoplastic other than TPU. In some embodiments, the capstock includes 12 wt. % to 24 wt. % of the thermoplastic other than TPU. In some embodiments, the capstock includes 13 wt. % to 24 wt. % of the thermoplastic other than TPU. In some embodiments, the capstock includes 14 wt. % to 24 wt. % of the thermoplastic other than TPU. In some embodiments, the capstock includes 15 wt. % to 24 wt. % of the thermoplastic other than TPU. In some embodiments, the capstock includes 16 wt. % to 24 wt. % of the thermoplastic other than TPU. In some embodiments, the capstock includes 17 wt. % to 24 wt. % of the thermoplastic other than TPU. In some embodiments, the capstock includes 18 wt. % to 24 wt. % of the thermoplastic other than TPU. In some embodiments, the capstock includes 19 wt. % to 24 wt. % of the thermoplastic other than TPU. In some embodiments, the capstock includes 20 wt. % to 24 wt. % of the thermoplastic other than TPU. In some embodiments, the capstock includes 21 wt. % to 24 wt. % of the thermoplastic other than TPU. In some embodiments, the capstock includes 22 wt. % to 24 wt. % of the thermoplastic other than TPU. In some embodiments, the capstock includes 23 wt. % to 24 wt. % of the thermoplastic other than TPU.

In some embodiments, the capstock includes 1 wt. % to 23 wt. % of the thermoplastic other than TPU. In some embodiments, the capstock includes 2 wt. % to 23 wt. % of the thermoplastic other than TPU. In some embodiments, the capstock includes 3 wt. % to 23 wt. % of the thermoplastic other than TPU. In some embodiments, the capstock includes 4 wt. % to 23 wt. % of the thermoplastic other than TPU. In some embodiments, the capstock includes 5 wt. % to 23 wt. % of the thermoplastic other than TPU. In some embodiments, the capstock includes 6 wt. % to 23 wt. % of the thermoplastic other than TPU. In some embodiments, the capstock includes 7 wt. % to 23 wt. % of the thermoplastic other than TPU. In some embodiments, the capstock includes 8 wt. % to 23 wt. % of the thermoplastic other than TPU. In some embodiments, the capstock includes 9 wt. % to 23 wt. % of the thermoplastic other than TPU. In some embodiments, the capstock includes 10 wt. % to 23 wt. % of the thermoplastic other than TPU. In some embodiments, the capstock includes 11 wt. % to 23 wt. % of the thermoplastic other than TPU. In some embodiments, the capstock includes 12 wt. % to 23 wt. % of the thermoplastic other than TPU. In some embodiments, the capstock includes 13 wt. % to 23 wt. % of the thermoplastic other than TPU. In some embodiments, the capstock includes 14 wt. % to 23 wt. % of the thermoplastic other than TPU. In some embodiments, the capstock includes 15 wt. % to 23 wt. % of the thermoplastic other than TPU. In some embodiments, the capstock includes 16 wt. % to 23 wt. % of the thermoplastic other than TPU. In some embodiments, the capstock includes 17 wt. % to 23 wt. % of the thermoplastic other than TPU. In some embodiments, the capstock includes 18 wt. % to 23 wt. % of the thermoplastic other than TPU. In some embodiments, the capstock includes 19 wt. % to 23 wt. % of the thermoplastic other than TPU. In some embodiments, the capstock includes 20 wt. % to 23 wt. % of the thermoplastic other than TPU. In some embodiments, the capstock includes 21 wt. % to 23 wt. % of the thermoplastic other than TPU. In some embodiments, the capstock includes 22 wt. % to 23 wt. % of the thermoplastic other than TPU.

In some embodiments, the capstock includes 1 wt. % to 22 wt. % of the thermoplastic other than TPU. In some embodiments, the capstock includes 2 wt. % to 22 wt. % of the thermoplastic other than TPU. In some embodiments, the capstock includes 3 wt. % to 22 wt. % of the thermoplastic other than TPU. In some embodiments, the capstock includes 4 wt. % to 22 wt. % of the thermoplastic other than TPU. In some embodiments, the capstock includes 5 wt. % to 22 wt. % of the thermoplastic other than TPU. In some embodiments, the capstock includes 6 wt. % to 22 wt. % of the thermoplastic other than TPU. In some embodiments, the capstock includes 7 wt. % to 22 wt. % of the thermoplastic other than TPU. In some embodiments, the capstock includes 8 wt. % to 22 wt. % of the thermoplastic other than TPU. In some embodiments, the capstock includes 9 wt. % to 22 wt. % of the thermoplastic other than TPU. In some embodiments, the capstock includes 10 wt. % to 22 wt. % of the thermoplastic other than TPU. In some embodiments, the capstock includes 11 wt. % to 22 wt. % of the thermoplastic other than TPU. In some embodiments, the capstock includes 12 wt. % to 22 wt. % of the thermoplastic other than TPU. In some embodiments, the capstock includes 13 wt. % to 22 wt. % of the thermoplastic other than TPU. In some embodiments, the capstock includes 14 wt. % to 22 wt. % of the thermoplastic other than TPU. In some embodiments, the capstock includes 15 wt. % to 22 wt. % of the thermoplastic other than TPU. In some embodiments, the capstock includes 16 wt. % to 22 wt. % of the thermoplastic other than TPU. In some embodiments, the capstock includes 17 wt. % to 22 wt. % of the thermoplastic other than TPU. In some embodiments, the capstock includes 18 wt. % to 22 wt. % of the thermoplastic other than TPU. In some embodiments, the capstock includes 19 wt. % to 22 wt. % of the thermoplastic other than TPU. In some embodiments, the capstock includes 20 wt. % to 22 wt. % of the thermoplastic other than TPU. In some embodiments, the capstock includes 21 wt. % to 22 wt. % of the thermoplastic other than TPU.

In some embodiments, the capstock includes 1 wt. % to 21 wt. % of the thermoplastic other than TPU. In some embodiments, the capstock includes 2 wt. % to 21 wt. % of the thermoplastic other than TPU. In some embodiments, the capstock includes 3 wt. % to 21 wt. % of the thermoplastic other than TPU. In some embodiments, the capstock includes 4 wt. % to 21 wt. % of the thermoplastic other than TPU. In some embodiments, the capstock includes 5 wt. % to 21 wt. % of the thermoplastic other than TPU. In some embodiments, the capstock includes 6 wt. % to 21 wt. % of the thermoplastic other than TPU. In some embodiments, the capstock includes 7 wt. % to 21 wt. % of the thermoplastic other than TPU. In some embodiments, the capstock includes 8 wt. % to 21 wt. % of the thermoplastic other than TPU. In some embodiments, the capstock includes 9 wt. % to 21 wt. % of the thermoplastic other than TPU. In some embodiments, the capstock includes 10 wt. % to 21 wt. % of the thermoplastic other than TPU. In some embodiments, the capstock includes 11 wt. % to 21 wt. % of the thermoplastic other than TPU. In some embodiments, the capstock includes 12 wt. % to 21 wt. % of the thermoplastic other than TPU. In some embodiments, the capstock includes 13 wt. % to 21 wt. % of the thermoplastic other than TPU. In some embodiments, the capstock includes 14 wt. % to 21 wt. % of the thermoplastic other than TPU. In some embodiments, the capstock includes 15 wt. % to 21 wt. % of the thermoplastic other than TPU. In some embodiments, the capstock includes 16 wt. % to 21 wt. % of the thermoplastic other than TPU. In some embodiments, the capstock includes 17 wt. % to 21 wt. % of the thermoplastic other than TPU. In some embodiments, the capstock includes 18 wt. % to 21 wt. % of the thermoplastic other than TPU. In some embodiments, the capstock includes 19 wt. % to 21 wt. % of the thermoplastic other than TPU. In some embodiments, the capstock includes 20 wt. % to 21 wt. % of the thermoplastic other than TPU.

In some embodiments, the capstock includes 1 wt. % to 20 wt. % of the thermoplastic other than TPU. In some embodiments, the capstock includes 2 wt. % to 20 wt. % of the thermoplastic other than TPU. In some embodiments, the capstock includes 3 wt. % to 20 wt. % of the thermoplastic other than TPU. In some embodiments, the capstock includes 4 wt. % to 20 wt. % of the thermoplastic other than TPU. In some embodiments, the capstock includes 5 wt. % to 20 wt. % of the thermoplastic other than TPU. In some embodiments, the capstock includes 6 wt. % to 20 wt. % of the thermoplastic other than TPU. In some embodiments, the capstock includes 7 wt. % to 20 wt. % of the thermoplastic other than TPU. In some embodiments, the capstock includes 8 wt. % to 20 wt. % of the thermoplastic other than TPU. In some embodiments, the capstock includes 9 wt. % to 20 wt. % of the thermoplastic other than TPU. In some embodiments, the capstock includes 10 wt. % to 20 wt. % of the thermoplastic other than TPU. In some embodiments, the capstock includes 11 wt. % to 20 wt. % of the thermoplastic other than TPU. In some embodiments, the capstock includes 12 wt. % to 20 wt. % of the thermoplastic other than TPU. In some embodiments, the capstock includes 13 wt. % to 20 wt. % of the thermoplastic other than TPU. In some embodiments, the capstock includes 14 wt. % to 20 wt. % of the thermoplastic other than TPU. In some embodiments, the capstock includes 15 wt. % to 20 wt. % of the thermoplastic other than TPU. In some embodiments, the capstock includes 16 wt. % to 20 wt. % of the thermoplastic other than TPU. In some embodiments, the capstock includes 17 wt. % to 20 wt. % of the thermoplastic other than TPU. In some embodiments, the capstock includes 18 wt. % to 20 wt. % of the thermoplastic other than TPU. In some embodiments, the capstock includes 19 wt. % to 20 wt. % of the thermoplastic other than TPU.

In some embodiments, the capstock includes 1 wt. % to 19 wt. % of the thermoplastic other than TPU. In some embodiments, the capstock includes 2 wt. % to 19 wt. % of the thermoplastic other than TPU. In some embodiments, the capstock includes 3 wt. % to 19 wt. % of the thermoplastic other than TPU. In some embodiments, the capstock includes 4 wt. % to 19 wt. % of the thermoplastic other than TPU. In some embodiments, the capstock includes 5 wt. % to 19 wt. % of the thermoplastic other than TPU. In some embodiments, the capstock includes 6 wt. % to 19 wt. % of the thermoplastic other than TPU. In some embodiments, the capstock includes 7 wt. % to 19 wt. % of the thermoplastic other than TPU. In some embodiments, the capstock includes 8 wt. % to 19 wt. % of the thermoplastic other than TPU. In some embodiments, the capstock includes 9 wt. % to 19 wt. % of the thermoplastic other than TPU. In some embodiments, the capstock includes 10 wt. % to 19 wt. % of the thermoplastic other than TPU. In some embodiments, the capstock includes 11 wt. % to 19 wt. % of the thermoplastic other than TPU. In some embodiments, the capstock includes 12 wt. % to 19 wt. % of the thermoplastic other than TPU. In some embodiments, the capstock includes 13 wt. % to 19 wt. % of the thermoplastic other than TPU. In some embodiments, the capstock includes 14 wt. % to 19 wt. % of the thermoplastic other than TPU. In some embodiments, the capstock includes 15 wt. % to 19 wt. % of the thermoplastic other than TPU. In some embodiments, the capstock includes 16 wt. % to 19 wt. % of the thermoplastic other than TPU. In some embodiments, the capstock includes 17 wt. % to 19 wt. % of the thermoplastic other than TPU. In some embodiments, the capstock includes 18 wt. % to 19 wt. % of the thermoplastic other than TPU.

In some embodiments, the capstock includes 1 wt. % to 18 wt. % of the thermoplastic other than TPU. In some embodiments, the capstock includes 2 wt. % to 18 wt. % of the thermoplastic other than TPU. In some embodiments, the capstock includes 3 wt. % to 18 wt. % of the thermoplastic other than TPU. In some embodiments, the capstock includes 4 wt. % to 18 wt. % of the thermoplastic other than TPU. In some embodiments, the capstock includes 5 wt. % to 18 wt. % of the thermoplastic other than TPU. In some embodiments, the capstock includes 6 wt. % to 18 wt. % of the thermoplastic other than TPU. In some embodiments, the capstock includes 7 wt. % to 18 wt. % of the thermoplastic other than TPU. In some embodiments, the capstock includes 8 wt. % to 18 wt. % of the thermoplastic other than TPU. In some embodiments, the capstock includes 9 wt. % to 18 wt. % of the thermoplastic other than TPU. In some embodiments, the capstock includes 10 wt. % to 18 wt. % of the thermoplastic other than TPU. In some embodiments, the capstock includes 11 wt. % to 18 wt. % of the thermoplastic other than TPU. In some embodiments, the capstock includes 12 wt. % to 18 wt. % of the thermoplastic other than TPU. In some embodiments, the capstock includes 13 wt. % to 18 wt. % of the thermoplastic other than TPU. In some embodiments, the capstock includes 14 wt. % to 18 wt. % of the thermoplastic other than TPU. In some embodiments, the capstock includes 15 wt. % to 18 wt. % of the thermoplastic other than TPU. In some embodiments, the capstock includes 16 wt. % to 18 wt. % of the thermoplastic other than TPU. In some embodiments, the capstock includes 17 wt. % to 18 wt. % of the thermoplastic other than TPU.

In some embodiments, the capstock includes 1 wt. % to 17 wt. % of the thermoplastic other than TPU. In some embodiments, the capstock includes 2 wt. % to 17 wt. % of the thermoplastic other than TPU. In some embodiments, the capstock includes 3 wt. % to 17 wt. % of the thermoplastic other than TPU. In some embodiments, the capstock includes 4 wt. % to 17 wt. % of the thermoplastic other than TPU. In some embodiments, the capstock includes 5 wt. % to 17 wt. % of the thermoplastic other than TPU. In some embodiments, the capstock includes 6 wt. % to 17 wt. % of the thermoplastic other than TPU. In some embodiments, the capstock includes 7 wt. % to 17 wt. % of the thermoplastic other than TPU. In some embodiments, the capstock includes 8 wt. % to 17 wt. % of the thermoplastic other than TPU. In some embodiments, the capstock includes 9 wt. % to 17 wt. % of the thermoplastic other than TPU. In some embodiments, the capstock includes 10 wt. % to 17 wt. % of the thermoplastic other than TPU. In some embodiments, the capstock includes 11 wt. % to 17 wt. % of the thermoplastic other than TPU. In some embodiments, the capstock includes 12 wt. % to 17 wt. % of the thermoplastic other than TPU. In some embodiments, the capstock includes 13 wt. % to 17 wt. % of the thermoplastic other than TPU. In some embodiments, the capstock includes 14 wt. % to 17 wt. % of the thermoplastic other than TPU. In some embodiments, the capstock includes 15 wt. % to 17 wt. % of the thermoplastic other than TPU. In some embodiments, the capstock includes 16 wt. % to 17 wt. % of the thermoplastic other than TPU.

In some embodiments, the capstock includes 1 wt. % to 16 wt. % of the thermoplastic other than TPU. In some embodiments, the capstock includes 2 wt. % to 16 wt. % of the thermoplastic other than TPU. In some embodiments, the capstock includes 3 wt. % to 16 wt. % of the thermoplastic other than TPU. In some embodiments, the capstock includes 4 wt. % to 16 wt. % of the thermoplastic other than TPU. In some embodiments, the capstock includes 5 wt. % to 16 wt. % of the thermoplastic other than TPU. In some embodiments, the capstock includes 6 wt. % to 16 wt. % of the thermoplastic other than TPU. In some embodiments, the capstock includes 7 wt. % to 16 wt. % of the thermoplastic other than TPU. In some embodiments, the capstock includes 8 wt. % to 16 wt. % of the thermoplastic other than TPU. In some embodiments, the capstock includes 9 wt. % to 16 wt. % of the thermoplastic other than TPU. In some embodiments, the capstock includes 10 wt. % to 16 wt. % of the thermoplastic other than TPU. In some embodiments, the capstock includes 11 wt. % to 16 wt. % of the thermoplastic other than TPU. In some embodiments, the capstock includes 12 wt. % to 16 wt. % of the thermoplastic other than TPU. In some embodiments, the capstock includes 13 wt. % to 16 wt. % of the thermoplastic other than TPU. In some embodiments, the capstock includes 14 wt. % to 16 wt. % of the thermoplastic other than TPU. In some embodiments, the capstock includes 15 wt. % to 16 wt. % of the thermoplastic other than TPU.

In some embodiments, the capstock includes 1 wt. % to 15 wt. % of the thermoplastic other than TPU. In some embodiments, the capstock includes 2 wt. % to 15 wt. % of the thermoplastic other than TPU. In some embodiments, the capstock includes 3 wt. % to 15 wt. % of the thermoplastic other than TPU. In some embodiments, the capstock includes 4 wt. % to 15 wt. % of the thermoplastic other than TPU. In some embodiments, the capstock includes 5 wt. % to 15 wt. % of the thermoplastic other than TPU. In some embodiments, the capstock includes 6 wt. % to 15 wt. % of the thermoplastic other than TPU. In some embodiments, the capstock includes 7 wt. % to 15 wt. % of the thermoplastic other than TPU. In some embodiments, the capstock includes 8 wt. % to 15 wt. % of the thermoplastic other than TPU. In some embodiments, the capstock includes 9 wt. % to 15 wt. % of the thermoplastic other than TPU. In some embodiments, the capstock includes 10 wt. % to 15 wt. % of the thermoplastic other than TPU. In some embodiments, the capstock includes 11 wt. % to 15 wt. % of the thermoplastic other than TPU. In some embodiments, the capstock includes 12 wt. % to 15 wt. % of the thermoplastic other than TPU. In some embodiments, the capstock includes 13 wt. % to 15 wt. % of the thermoplastic other than TPU. In some embodiments, the capstock includes 14 wt. % to 15 wt. % of the thermoplastic other than TPU.

In some embodiments, the capstock includes 1 wt. % to 14 wt. % of the thermoplastic other than TPU. In some embodiments, the capstock includes 2 wt. % to 14 wt. % of the thermoplastic other than TPU. In some embodiments, the capstock includes 3 wt. % to 14 wt. % of the thermoplastic other than TPU. In some embodiments, the capstock includes 4 wt. % to 14 wt. % of the thermoplastic other than TPU. In some embodiments, the capstock includes 5 wt. % to 14 wt. % of the thermoplastic other than TPU. In some embodiments, the capstock includes 6 wt. % to 14 wt. % of the thermoplastic other than TPU. In some embodiments, the capstock includes 7 wt. % to 14 wt. % of the thermoplastic other than TPU. In some embodiments, the capstock includes 8 wt. % to 14 wt. % of the thermoplastic other than TPU. In some embodiments, the capstock includes 9 wt. % to 14 wt. % of the thermoplastic other than TPU. In some embodiments, the capstock includes 10 wt. % to 14 wt. % of the thermoplastic other than TPU. In some embodiments, the capstock includes 11 wt. % to 14 wt. % of the thermoplastic other than TPU. In some embodiments, the capstock includes 12 wt. % to 14 wt. % of the thermoplastic other than TPU. In some embodiments, the capstock includes 13 wt. % to 14 wt. % of the thermoplastic other than TPU.

In some embodiments, the capstock includes 1 wt. % to 13 wt. % of the thermoplastic other than TPU. In some embodiments, the capstock includes 2 wt. % to 13 wt. % of the thermoplastic other than TPU. In some embodiments, the capstock includes 3 wt. % to 13 wt. % of the thermoplastic other than TPU. In some embodiments, the capstock includes 4 wt. % to 13 wt. % of the thermoplastic other than TPU. In some embodiments, the capstock includes 5 wt. % to 13 wt. % of the thermoplastic other than TPU. In some embodiments, the capstock includes 6 wt. % to 13 wt. % of the thermoplastic other than TPU. In some embodiments, the capstock includes 7 wt. % to 13 wt. % of the thermoplastic other than TPU. In some embodiments, the capstock includes 8 wt. % to 13 wt. % of the thermoplastic other than TPU. In some embodiments, the capstock includes 9 wt. % to 13 wt. % of the thermoplastic other than TPU. In some embodiments, the capstock includes 10 wt. % to 13 wt. % of the thermoplastic other than TPU. In some embodiments, the capstock includes 11 wt. % to 13 wt. % of the thermoplastic other than TPU. In some embodiments, the capstock includes 12 wt. % to 13 wt. % of the thermoplastic other than TPU.

In some embodiments, the capstock includes 1 wt. % to 12 wt. % of the thermoplastic other than TPU. In some embodiments, the capstock includes 2 wt. % to 12 wt. % of the thermoplastic other than TPU. In some embodiments, the capstock includes 3 wt. % to 12 wt. % of the thermoplastic other than TPU. In some embodiments, the capstock includes 4 wt. % to 12 wt. % of the thermoplastic other than TPU. In some embodiments, the capstock includes 5 wt. % to 12 wt. % of the thermoplastic other than TPU. In some embodiments, the capstock includes 6 wt. % to 12 wt. % of the thermoplastic other than TPU. In some embodiments, the capstock includes 7 wt. % to 12 wt. % of the thermoplastic other than TPU. In some embodiments, the capstock includes 8 wt. % to 12 wt. % of the thermoplastic other than TPU. In some embodiments, the capstock includes 9 wt. % to 12 wt. % of the thermoplastic other than TPU. In some embodiments, the capstock includes 10 wt. % to 12 wt. % of the thermoplastic other than TPU. In some embodiments, the capstock includes 11 wt. % to 12 wt. % of the thermoplastic other than TPU.

In some embodiments, the capstock includes 1 wt. % to 11 wt. % of the thermoplastic other than TPU. In some embodiments, the capstock includes 2 wt. % to 11 wt. % of the thermoplastic other than TPU. In some embodiments, the capstock includes 3 wt. % to 11 wt. % of the thermoplastic other than TPU. In some embodiments, the capstock includes 4 wt. % to 11 wt. % of the thermoplastic other than TPU. In some embodiments, the capstock includes 5 wt. % to 11 wt. % of the thermoplastic other than TPU. In some embodiments, the capstock includes 6 wt. % to 11 wt. % of the thermoplastic other than TPU. In some embodiments, the capstock includes 7 wt. % to 11 wt. % of the thermoplastic other than TPU. In some embodiments, the capstock includes 8 wt. % to 11 wt. % of the thermoplastic other than TPU. In some embodiments, the capstock includes 9 wt. % to 11 wt. % of the thermoplastic other than TPU. In some embodiments, the capstock includes 10 wt. % to 11 wt. % of the thermoplastic other than TPU.

In some embodiments, the capstock includes 1 wt. % to 10 wt. % of the thermoplastic other than TPU. In some embodiments, the capstock includes 2 wt. % to 10 wt. % of the thermoplastic other than TPU. In some embodiments, the capstock includes 3 wt. % to 10 wt. % of the thermoplastic other than TPU. In some embodiments, the capstock includes 4 wt. % to 10 wt. % of the thermoplastic other than TPU. In some embodiments, the capstock includes 5 wt. % to 10 wt. % of the thermoplastic other than TPU. In some embodiments, the capstock includes 6 wt. % to 10 wt. % of the thermoplastic other than TPU. In some embodiments, the capstock includes 7 wt. % to 10 wt. % of the thermoplastic other than TPU. In some embodiments, the capstock includes 8 wt. % to 10 wt. % of the thermoplastic other than TPU. In some embodiments, the capstock includes 9 wt. % to 10 wt. % of the thermoplastic other than TPU.

In some embodiments, the capstock includes 1 wt. % to 9 wt. % of the thermoplastic other than TPU. In some embodiments, the capstock includes 2 wt. % to 9 wt. % of the thermoplastic other than TPU. In some embodiments, the capstock includes 3 wt. % to 9 wt. % of the thermoplastic other than TPU. In some embodiments, the capstock includes 4 wt. % to 9 wt. % of the thermoplastic other than TPU. In some embodiments, the capstock includes 5 wt. % to 9 wt. % of the thermoplastic other than TPU. In some embodiments, the capstock includes 6 wt. % to 9 wt. % of the thermoplastic other than TPU. In some embodiments, the capstock includes 7 wt. % to 9 wt. % of the thermoplastic other than TPU. In some embodiments, the capstock includes 8 wt. % to 9 wt. % of the thermoplastic other than TPU.

In some embodiments, the capstock includes 1 wt. % to 8 wt. % of the thermoplastic other than TPU. In some embodiments, the capstock includes 2 wt. % to 8 wt. % of the thermoplastic other than TPU. In some embodiments, the capstock includes 3 wt. % to 8 wt. % of the thermoplastic other than TPU. In some embodiments, the capstock includes 4 wt. % to 8 wt. % of the thermoplastic other than TPU. In some embodiments, the capstock includes 5 wt. % to 8 wt. % of the thermoplastic other than TPU. In some embodiments, the capstock includes 6 wt. % to 8 wt. % of the thermoplastic other than TPU. In some embodiments, the capstock includes 7 wt. % to 8 wt. % of the thermoplastic other than TPU.

In some embodiments, the capstock includes 1 wt. % to 7 wt. % of the thermoplastic other than TPU. In some embodiments, the capstock includes 2 wt. % to 7 wt. % of the thermoplastic other than TPU. In some embodiments, the capstock includes 3 wt. % to 7 wt. % of the thermoplastic other than TPU. In some embodiments, the capstock includes 4 wt. % to 7 wt. % of the thermoplastic other than TPU. In some embodiments, the capstock includes 5 wt. % to 7 wt. % of the thermoplastic other than TPU. In some embodiments, the capstock includes 6 wt. % to 7 wt. % of the thermoplastic other than TPU.

In some embodiments, the capstock includes 1 wt. % to 6 wt. % of the thermoplastic other than TPU. In some embodiments, the capstock includes 2 wt. % to 6 wt. % of the thermoplastic other than TPU. In some embodiments, the capstock includes 3 wt. % to 6 wt. % of the thermoplastic other than TPU. In some embodiments, the capstock includes 4 wt. % to 6 wt. % of the thermoplastic other than TPU. In some embodiments, the capstock includes 5 wt. % to 6 wt. % of the thermoplastic other than TPU.

In some embodiments, the capstock includes 1 wt. % to 5 wt. % of the thermoplastic other than TPU. In some embodiments, the capstock includes 2 wt. % to 5 wt. % of the thermoplastic other than TPU. In some embodiments, the capstock includes 3 wt. % to 5 wt. % of the thermoplastic other than TPU. In some embodiments, the capstock includes 4 wt. % to 5 wt. % of the thermoplastic other than TPU.

In some embodiments, the capstock includes 1 wt. % to 4 wt. % of the thermoplastic other than TPU. In some embodiments, the capstock includes 2 wt. % to 4 wt. % of the thermoplastic other than TPU. In some embodiments, the capstock includes 3 wt. % to 4 wt. % of the thermoplastic other than TPU.

In some embodiments, the capstock includes 1 wt. % to 3 wt. % of the thermoplastic other than TPU. In some embodiments, the capstock includes 2 wt. % to 3 wt. % of the thermoplastic other than TPU. In some embodiments, the capstock includes 1 wt. % to 2 wt. % of the thermoplastic other than TPU.

Optional Additives

As stated, in some embodiments, the capstock includes one or more optional additives. In some embodiments, the optional additive includes one or more of a colorant, pigment, plasticizer, lubricant, UV stabilizer, light stabilizer, thermal stabilizer, antioxidant, antistatic agent, flame retardant, filler, fiber, processing aid, biocide, surfactant, blowing agent, foaming agent, wax, and/or combinations thereof.

Figure 1:
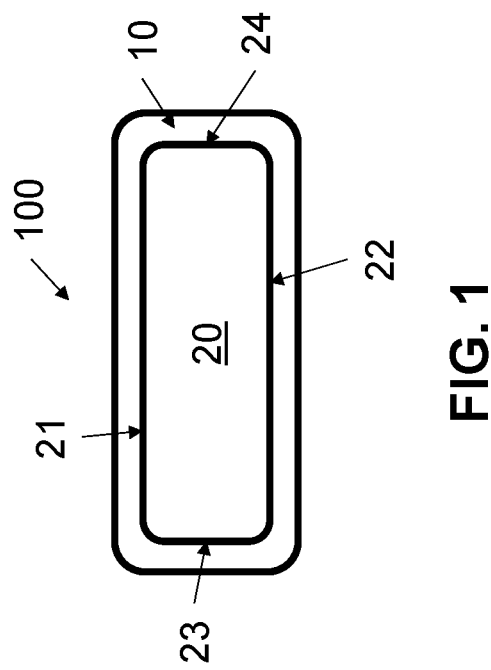
FIG. 1 is a schematic cross-sectional view of a building material, in accordance with some embodiments of the invention.

With reference to the drawings, FIG. 1 is a schematic cross-sectional view of a building material, in accordance with some embodiments of the invention. As FIG. 1 show, in some embodiments, the building material 100 is a composite board, including a capstock 10 and a core 20. In some embodiments, the capstock 10 at least partially covers one or more surfaces of the core 20, such as a top surface 21, a bottom surface 22, a first side surface 23, and a second side surface 24. It is of course understood that the building material may be oriented such that any outer surface may be designated as "top," "bottom," and "side" depending on the specific orientation. Thus, in some embodiments, the capstock covers an outer surface of the core 20.

FIG. 2 is a block diagram of a method of forming the building material, in accordance with some embodiments of the invention. As FIG. 2 shows, in some embodiments, the method includes obtaining formulations for the capstock and the core, as represented by block 210. As the figure also shows, in some embodiments, the capstock is coextruded with the core, as represented by block 220. In some embodiments, coextrusion results in opposite ends of the core being uncovered, while other outer surfaces of the core are covered by the capstock.

Comparative Examples—ASTM D4060-19 Testing

In accordance with ASTM D4060-19 Standard Test Method for Abrasion Resistance of Organic Coatings, four capstock materials were manufactured. Each of the materials included the indicated weight percentage of the following components, based on the total weight of the capstock: 39.1 wt. % of PVC, 24.7 wt. % of ASA, and 18.2 wt. % of SAN, with the remaining 18 wt. % of a thermoplastic elastomer or polymeric plasticizer. The thermoplastic elastomer or polymeric plasticizer for each of the capstock materials is as set forth in Table 1.

TABLE 1

| Capstock Material No. | Thermoplastic Elastomer or Polymeric Plasticizer present at 18 wt. % |
| --- | --- |
| 1 | TPU |
| 2 | Terpolymer |
| 3 | Thermoplastic copolyester elastomer |
| 4 | SIBS |

Evaluation after testing indicates the following weight loss for each of these materials, as set forth in Table 2.

TABLE 2

| Capstock Material No. | Weight loss (grams) |
| --- | --- |
| 1 | 0.23 |
| 2 | 0.17 |
| 3 | 0.20 |
| 4 | 0.21 |

Thus, each of the capstock materials with thermoplastic elastomers other than TPU performed better than the capstock material with TPU as the thermoplastic elastomer.

Comparative Examples—Dow Water Immersion—Moisture Whitening Testing

In accordance with the Dow Water Immersion—Moisture Whitening Testing procedure, four capstock materials were manufactured. Each of the materials included the indicated weight percentage of the following components, based on the total weight of the capstock: 39.1 wt. % of PVC, 24.7 wt. % of ASA, and 18.2 wt. % of SAN, with the remaining 18 wt. % of a thermoplastic elastomer or polymeric plasticizer. The thermoplastic elastomer or polymeric plasticizer for each of the capstock materials is as set forth in Table 1 above.

Evaluation after testing indicates the following delta L for each of these materials, as set forth in Table 3.

TABLE 3

| Capstock Material No. | Delta L |
| --- | --- |
| 1 | 0.57 |
| 2 | −0.31 |
| 3 | 0.47 |
| 4 | 0.08 |

Thus, each of the capstock materials with thermoplastic elastomers other than TPU performed better than the capstock material with TPU as the thermoplastic elastomer.

Variations, modifications, and alterations to embodiments of the present disclosure described above will make themselves apparent to those skilled in the art. All such variations, modifications, alterations and the like are intended to fall within the spirit and scope of the present disclosure, limited solely by the appended claims.

While several embodiments of the present disclosure have been described, it is understood that these embodiments are illustrative only, and not restrictive, and that many modifications may become apparent to those of ordinary skill in the art. For example, all dimensions discussed herein are provided as examples only, and are intended to be illustrative and not restrictive.

Any feature or element that is positively identified in this description may also be specifically excluded as a feature or element of an embodiment of the present as defined in the claims.

The disclosure described herein may be practiced in the absence of any element or elements, limitation or limitations, which is not specifically disclosed herein. The terms and expressions which have been employed are used as terms of description and not of limitation, and there is no intention in the use of such terms and expressions of excluding any equivalents of the features shown and described or portions thereof, but it is recognized that various modifications are possible within the scope of the disclosure.

The invention claimed is:

1. A composite board, comprising:
   a core; and
   a capstock positioned to at least partially cover the core, wherein the capstock consists of, based on a total weight of the capstock:
   30 wt. % to 45 wt. % of polyvinyl chloride (PVC);
   20 wt. % to 30 wt. % of acrylonitrile-styrene-acrylate (ASA);
   15 wt. % to 20 wt. % of styrene-acrylonitrile (SAN); and
   10 wt. % to 25 wt. % of a polymeric plasticizer, wherein the polymeric plasticizer consists of a ketone ethylene ester terpolymer.

2. The composite board of claim 1, wherein the capstock contains:
   35 wt. % to 45 wt. % of PVC.

3. A composite board, comprising:
   a core; and a capstock positioned to at least partially cover the core,
wherein the capstock consists of, based on a total weight of the capstock:
30 wt. % to 50 wt. % of polyvinyl chloride (PVC);
20 wt. % to 40 wt. % of acrylonitrile-styrene-acrylate (ASA);
10 wt. % to 30 wt. % of styrene-acrylonitrile (SAN); and
5 wt. % to 30 wt. % of a polymeric plasticizer, wherein the polymeric plasticizer consists of a ketone ethylene ester terpolymer.

* * * * *